(12) United States Patent
Freeman et al.

(10) Patent No.: US 11,300,855 B2
(45) Date of Patent: Apr. 12, 2022

(54) WASTEWATER MONITORING SYSTEM AND METHOD

(71) Applicant: I&Eye Enterprises, LLC, Westwood, KS (US)

(72) Inventors: Brandon C. Freeman, Springfield, MO (US); Jeremy R. Schueler, Columbia, IL (US)

(73) Assignee: I&Eye Enterprises, LLC, Westwood, KS (US)

( * ) Notice: Subject to any disclaimer, the term of this patent is extended or adjusted under 35 U.S.C. 154(b) by 0 days.

(21) Appl. No.: 16/805,004

(22) Filed: Feb. 28, 2020

(65) Prior Publication Data

US 2020/0201146 A1    Jun. 25, 2020

Related U.S. Application Data

(60) Continuation-in-part of application No. 15/698,185, filed on Sep. 7, 2017, now Pat. No. 10,602,040, which
(Continued)

(51) Int. Cl.
*H04N 5/225* (2006.01)
*G03B 17/08* (2021.01)
(Continued)

(52) U.S. Cl.
CPC ............ *G03B 17/08* (2013.01); *G03B 31/00* (2013.01); *G03B 37/005* (2013.01);
(Continued)

(58) Field of Classification Search
CPC ....... H04N 5/2254; G03B 17/08; G03B 14/08
See application file for complete search history.

(56) References Cited

U.S. PATENT DOCUMENTS 4,567,514 A    1/1986   Morgan et al.
4,974,168 A   11/1990   Marx
(Continued)

OTHER PUBLICATIONS

Browning; "Spec Ops Series" (webpage screenshot); Jun. 11, 2013; http://web.archive.org/web/20130611160456/http://browningtrailcameras.com/our-products/trail-cameras/spec-ops-series/.
(Continued)

*Primary Examiner* — Clayton E. LaBalle
*Assistant Examiner* — Diana Hancock
(74) *Attorney, Agent, or Firm* — Martin & Associates, LLC; Derek P. Martin

(57) ABSTRACT

A wastewater monitoring system uses a digital camera in a fixed location in a wastewater pipe. The digital camera is coupled to a binary sensor that provides a binary trip signal that indicates when the sensor detects wastewater in the pipe exceeding a defined threshold. When the digital camera detects a trip signal from the binary sensor, operating logic in the digital camera changes frequency for taking pictures. The digital camera preferably adds visible data to a stored digital photograph file that may include any or all of the following: camera serial number, state of sensor(s), temperature, battery level in the digital camera, and battery level in the sensor(s). The visible data is stored in the digital photograph file such that the visible information is overlaid on the digital photograph so it is visible to the eye of the person viewing the digital photograph.

5 Claims, 19 Drawing Sheets

Related U.S. Application Data is a continuation-in-part of application No. 15/595,901, filed on May 15, 2017, now abandoned, which is a division of application No. 14/634,104, filed on Feb. 27, 2015, now Pat. No. 9,756,231.

(51) Int. Cl.
*G03B 37/00* (2021.01)
*G03B 31/00* (2021.01)

(52) U.S. Cl.
CPC ......... *H04N 5/2252* (2013.01); *H04N 5/2254* (2013.01); *G03B 2215/0567* (2013.01); *H04N 2005/2255* (2013.01)

(56) References Cited

U.S. PATENT DOCUMENTS

| | | | |
|---|---|---|---|
| 7,002,620 B1 | 2/2006 | Rutledge | |
| 7,426,339 B2 | 9/2008 | Takanashi | |
| 7,626,508 B2 | 12/2009 | Kosuge et al. | |
| 7,715,701 B2 | 5/2010 | Lange | |
| 8,054,459 B2 | 11/2011 | Lindner | |
| 8,085,309 B1 | 12/2011 | Kelliher | |
| 8,087,311 B2 | 1/2012 | Merlo | |
| 8,243,984 B1 | 8/2012 | Brown et al. | |
| 8,381,593 B2 | 2/2013 | De Lorenzo et al. | |
| 2001/0005452 A1 | 6/2001 | Uchiyama et al. | |
| 2002/0140848 A1 | 10/2002 | Cooper et al. | |
| 2005/0091311 A1 | 4/2005 | Lund et al. | |
| 2006/0290779 A1 | 12/2006 | Reverte et al. | |
| 2007/0103324 A1* | 5/2007 | Kosuge | E03F 7/00 340/618 |
| 2007/0106527 A1 | 5/2007 | McKinney | |
| 2007/0242134 A1 | 10/2007 | Zernov | |
| 2008/0210024 A1 | 9/2008 | Merlo | |
| 2009/0105969 A1 | 4/2009 | Saylor | |
| 2009/0110380 A1 | 4/2009 | Fantone et al. | |
| 2011/0148647 A1* | 6/2011 | Miller, II | E02D 29/1481 340/686.1 |
| 2011/0156917 A1* | 6/2011 | Wang | G01F 23/686 340/603 |
| 2012/0305458 A1 | 12/2012 | Jensen et al. | |
| 2013/0335550 A1 | 12/2013 | Rochenski et al. | |
| 2014/0241616 A1* | 8/2014 | Medvedovsky | G06Q 30/0275 382/156 |
| 2014/0324406 A1 | 10/2014 | Nesbitt et al. | |
| 2015/0229785 A1* | 8/2015 | Choi | H04N 5/232941 348/207.11 |
| 2015/0338315 A1* | 11/2015 | Manahan | G01M 99/008 702/183 |
| 2015/0339407 A1* | 11/2015 | Gallo | G06F 16/951 707/736 |
| 2016/0042532 A1* | 2/2016 | Lo | G06T 7/11 382/100 |
| 2016/0203398 A1* | 7/2016 | Meyer | G05B 11/01 340/5.1 |

OTHER PUBLICATIONS

Browning; "Timelapse View Plus" (webpage screenshot); Jun. 22, 2013; http://web.archive.org/web/20140515022034/http://browningtrailcameras.com/our-products/trail-cameras/timelapse-viewer-plus/.

Browning; "Product Instructions" (webpage screenshot); Jan. 10, 2014; http://web.archive.org/web/20140110094943/http://browningtrailcameras.com/customer-service/product-instructions/.

Browning; "Instruction Manual"; PDF Linked from Jan. 10, 2014 web.archieve.org, http://browningtrailcameras.com/wp-content/uploads/2012/10/Spec-Ops-user-manual-med-res.pdf.

Montgomery, M.; Time Lapse Video; Feb. 1,2010; https://www.videomaker.com/article/c3/14612-time-lapse-video; pp. 1-9.

Microsoft; "how do I use a circle to identify a player in a sports video made with movie maker"; Sep. 7, 2012; http ://answers.microsoft.com/en-us/windowslive/forum/moviemaker-av/how-do-i-use-a-circle-to-identify-a-player-in-a/54491480-9721-4825-a0a1-9d159703370b; pp. 1-7.

Stackoverflow.com; "how can I quantify difference between two images?"; Oct. 10, 2008; http://stackoverflow.com/questions/189943/how-can-i-quantify-difference-between-two-images?answertab=votes#tab-top.

BriefCam, Rapid Video Review: Benefits and Payoff, printed from http://briefcam.com/lorem-ipsum-dolor-sit-amet-consectetur-adipiscing-elit/ on Jan. 14, 2017.

\* cited by examiner

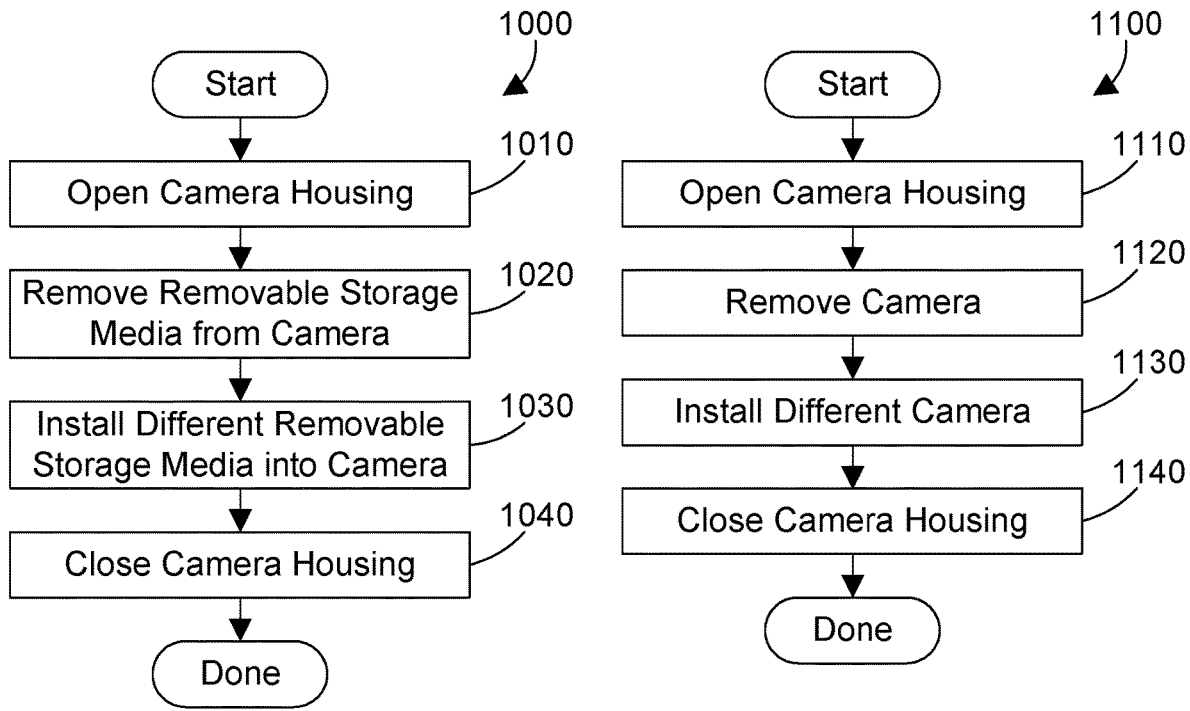
FIG. 10
FIG. 11
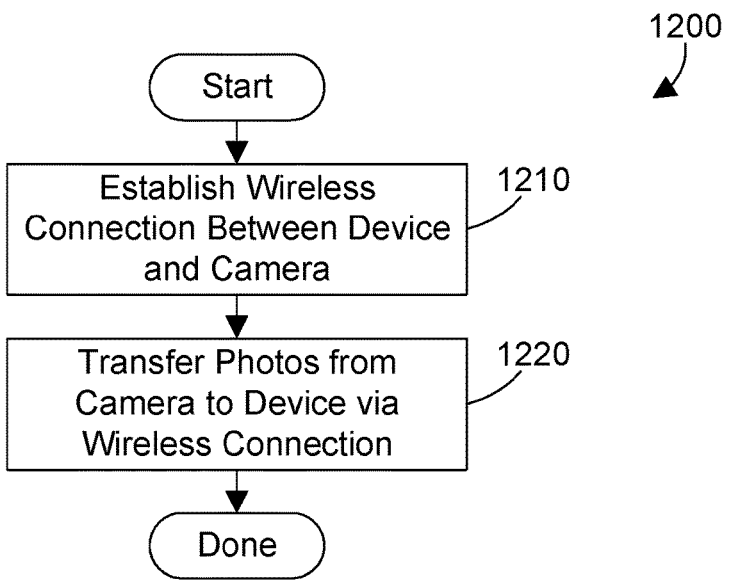
FIG. 12

| Camera Operational Logic | |
|---|---|
| Condition | Action |
| Floats A, B, C clear | Take 1 picture every hour |
| Float A set, Floats B and C clear | Take 1 picture every 10 minutes |
| Floats A and B set, Float C clear | Take 1 picture every 1 minute |
| Floats A, B, C set | Take 1 picture every 10 seconds |

WASTEWATER MONITORING SYSTEM AND METHOD

BACKGROUND

1. Technical Field

This disclosure generally relates to wastewater monitoring, and more specifically relates to monitoring levels of wastewater in a pipe.

2. Background Art

Many different systems have been developed over the years for monitoring or inspecting the interior of a pipe. For example, U.S. Pat. No. 8,087,311 issued on Jan. 3, 2012 to Stephen A. Merlot discloses a system that includes multiple cameras attached to an interior surface of a pipe that are connected to a data communication network so the data from the camera may be transmitted over the data communication network. A computing device in a remote location receives the data transmitted over the data communication network by the cameras.

The system disclosed in the Merlo patent referenced above requires a constant connection between the cameras and a remote computer system. In addition, the Merlo system is relatively expensive. What is needed is a system and method for monitoring levels in a wastewater pipe that is inexpensive and simple to use.

BRIEF SUMMARY

A wastewater monitoring system uses a digital camera in a fixed location in a wastewater pipe. The digital camera is coupled to a binary sensor that provides a binary trip signal that indicates when the sensor detects wastewater in the pipe exceeding a defined threshold. When the digital camera detects a trip signal from the binary sensor, operating logic in the digital camera changes frequency for taking pictures. The digital camera preferably adds visible data to a stored digital photograph file that may include any or all of the following: camera serial number, state of one or more sensors, temperature, battery level of a battery in the digital camera, and battery level of a battery in one or more sensor(s). The visible data is stored in the digital photograph file such that the visible information is overlaid on the digital photograph so it is visible to the eye of the person viewing the digital photograph.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a flow diagram of a method for retrieving photographs from a camera that uses removable storage media;

FIG. 11 is a flow diagram of a method for retrieving photographs from a camera by swapping with a different camera;

FIG. 12 is a flow diagram of a method for retrieving photographs from a camera using a device that receives the photographs from the camera via a wireless connection;

DETAILED DESCRIPTION

Figure 1:
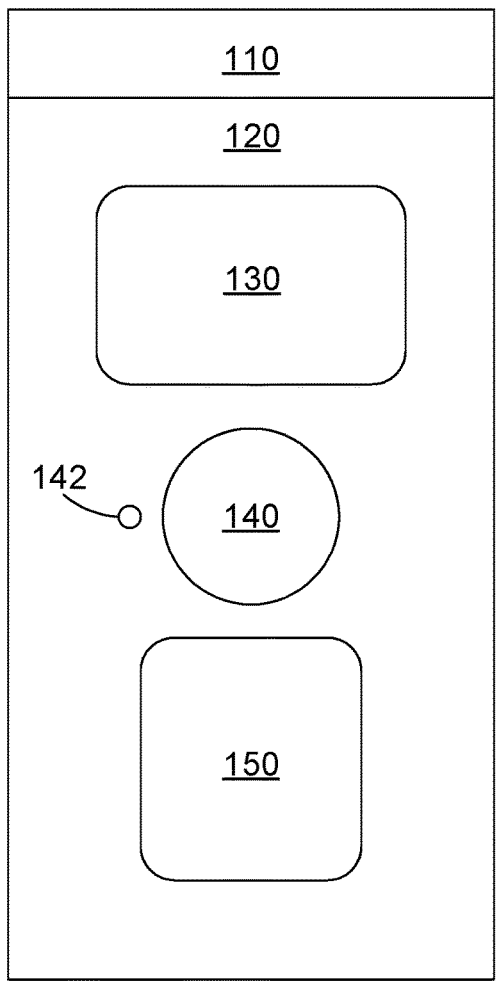
FIG. 1 is front view of a camera that could be used in the wastewater monitoring system disclosed herein.

Most municipalities have separate systems for storm drains and for sewer. Sewage from homes and businesses typically runs in sewage pipes to a sewage treatment plant, which treats the sewage and outputs clean water. Storm water systems typically receive runoff from rain storms and direct the storm water to a holding basin, to a neighboring river or creek, etc. Because storm water is typically runoff from a storm, it typically does not contain sewage or other impurities that require significant treatment. As a result, storm water can often be returned to natural water sources such as creeks or rivers without treatment.

While sewer systems and storm water systems are designed to be separate, sometimes leaks can develop between the two. If storm water leaks into a sewage pipe, the result may be volumes of flow that exceed the design parameters of the sewage pipe. This can cause sewage systems to back up, and can also cause excessive flows to the sewage treatment plant.

Detecting when storm water leaks into a sewage pipe is not a simple or straight-forward process. The degree of the leak can obviously depend on the amount of runoff generated by a storm. Because storms that generate significant runoff are not daily events, a monitoring system must be able to monitor a location of interest for long periods of times, typically spanning several days or weeks. Many of the known systems for monitoring water levels in pipes are sophisticated and expensive. Small municipalities that have issues with storm water leaking into sewage pipes typically do not have the funds to invest in known sophisticated and expensive monitoring systems. For example, U.S. Pat. No. 8,087,311 issued on Jan. 3, 2012 to Stephen A. Merlot (discussed above in the Background Art section) discloses a system that includes multiple cameras attached to an interior surface of a pipe that are connected to a data communication network so the data from the camera may be transmitted over the data communication network. A computing device in a remote location receives the data transmitted over the data communication network by the cameras. Needless to say, installing multiple cameras in a pipe and installing a communication network is an expensive process. What is needed is a simple and inexpensive way to monitor water level in a pipe over days or weeks. The disclosure and claims herein provide a system and method that can detect water level in a pipe without the complexity and expense of known systems.

A wastewater monitoring system uses a digital camera in a fixed location in a wastewater pipe. The digital camera is coupled to a binary sensor that provides a binary trip signal that indicates when the sensor detects wastewater in the pipe exceeding a defined threshold. When the digital camera detects a trip signal from the binary sensor, operating logic in the digital camera changes frequency for taking pictures. The digital camera preferably adds visible data to a stored digital photograph file that may include any or all of the following: camera serial number, state of one or more sensors, temperature, battery level of a battery in the digital camera, and battery level of a battery in one or more sensor(s). The visible data is stored in the digital photograph file such that the visible information is overlaid on the digital photograph so it is visible to the eye of the person viewing the digital photograph.

As used herein, the term "wastewater monitoring system" refers to a system that can detect a level of water or other liquid-based material in a gravity-fed pipe. The term "wastewater" in this context means material in any suitable pipe, including without limitation sewer pipes and storm water pipes. Of course, the monitoring system could be used to monitor level of any material in any gravity-fed pipe, whether water-based or not. The disclosure and claims herein expressly extend to monitoring level of a material in any gravity-fed pipe, whether currently known or developed in the future.

Figure 2:
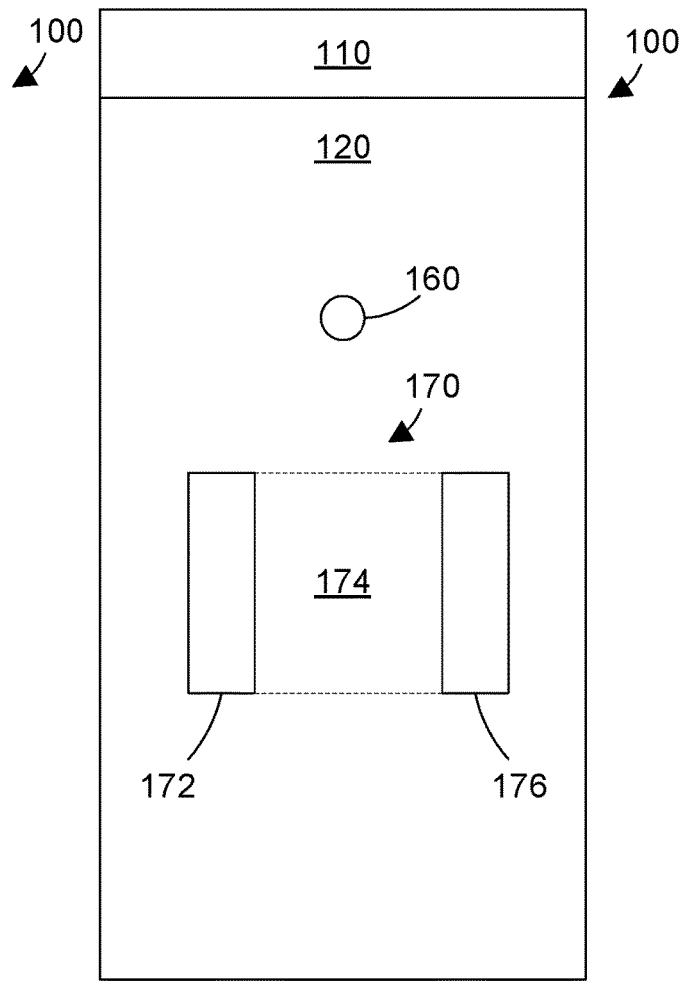
FIG. 2 is a rear view of the camera shown in FIG. 1.

In accordance with the system and method disclosed herein, a single camera can be mounted in a fixed location in or near a wastewater pipe that takes a still photograph of a location of interest at defined intervals. One suitable camera that can be used in the system and method disclosed herein is a digital battery-operated 8 megapixel camera that is marketed by Shenzhen Siyuan Digital Technology Co., Ltd. as a home security camera. This camera is represented as camera 100 in FIGS. 1-4 and 7. FIG. 1 shows a front view of camera 100, which includes a top 110 that covers a battery compartment, a cylindrical body 120, an array of infrared illuminators 130, a lens 140, a laser 142, and a motion sensor 150. Note the motion sensor 150 is typically not used in the wastewater monitoring system disclosed herein. The laser 142 is used to provide a visual indication of where the camera is pointed. The back view of camera 100 shown in FIG. 2 shows a threaded insert 160 that is sized to receive the mounting post on most tripods, and a belt slot defined by two openings 172 and 176 that are interconnected with a passage 174, allowing a strap to be passed through the slot to attach the camera to something using a strap.

Figure 3:
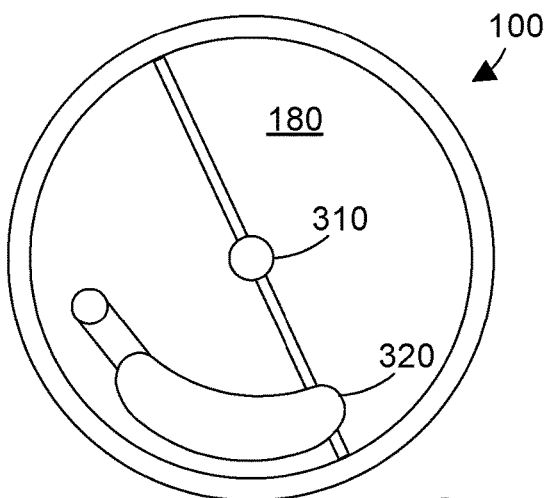
FIG. 3 is a bottom view of the camera shown in FIGS. 1 and 2 with the bottom cover in place.

FIG. 3 shows a bottom view of the camera with the bottom cover 180 in place. The bottom cover 180 includes another threaded insert 310 that is sized to receive the mounting post on most tripods. The bottom cover 180 also includes a rubber cover 320 that provides a sealed cover that can be removed to access the switch 460 and the DC power jack 470 shown in FIG. 4 without removing the bottom cover 180.

Figure 4:
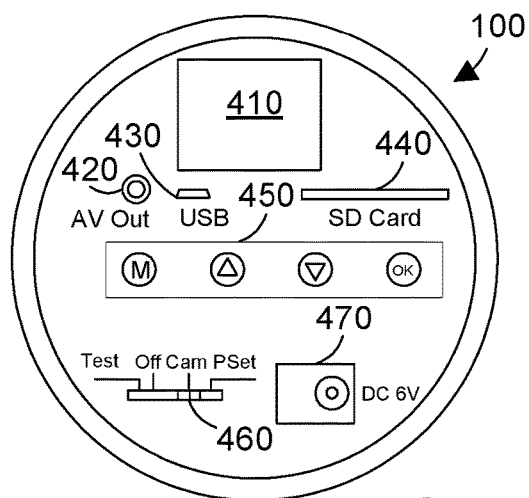
FIG. 4 is a bottom view of the camera shown in FIGS. 1 and 2 with the bottom cover removed.

FIG. 4 shows the bottom view of the camera 100 with the bottom cover 180 in FIG. 3 removed. The camera includes a small display 410, an Audio/Video Out jack 420, a micro USB jack 430, an SD card slot 440, a set of push buttons 450, a switch 460, and a DC power jack 470. The switch 460 and buttons 450 allow programming the camera for a desired mode of operation. Thus, using the display 410, buttons 450 and switch 460, the user could configure the camera to take a still photograph once every five minutes, for example. Once the camera is programmed for the desired function, the bottom cover 180 shown in FIG. 3 can be replaced, and the camera 100 is then ready to be deployed to monitor a location of interest.

Figure 5:
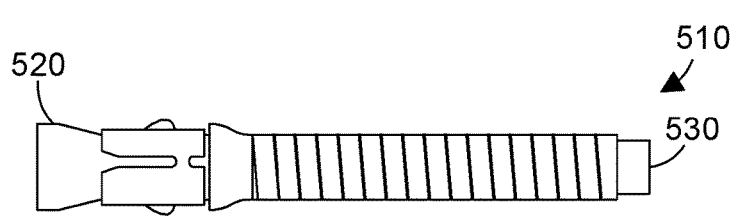
FIG. 5 is a side view of a concrete anchor.
Figure 6:
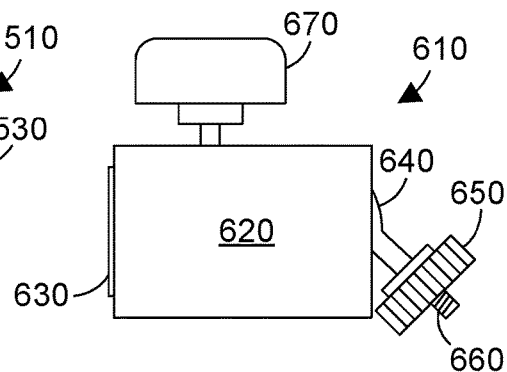
FIG. 6 is a side view of a ball joint.

Most wastewater systems have manholes that are typically made of brick or concrete and pipes that are typically made of concrete, polyvinyl chloride (PVC), clay, and other materials. Manholes are typically covered with manhole covers to provide access to the pipes to people who need to service the system. In the most preferred implementation, the camera 100 in FIGS. 1-4 is deployed to a location near a manhole, and is attached to a side of the concrete manhole or pipe using a concrete anchor 510 shown in FIG. 5. Concrete anchors 510 as shown in FIG. 5 are well-known and are available from a number of different suppliers. FIG. 6 shows a ball joint 610 that can be used to point the camera to a location of interest. The ball joint 610 includes an adjustment knob 670 that, when loose, allows the shaft comprising 640, 650 and 660 to pivot in relation to the position of the body 620. Once the adjustment knob 670 is tightened, the shaft comprising 640, 650 and 660 is locked into position. Ball joint 610 also includes a metal internally threaded insert 630. Ball joint 610 is one suitable example of a direction orientation mechanism that can be used to fixedly mount the camera to point to the location of interest. Many other direction orientation mechanisms could be used within the scope of the disclosure and claims herein. One suitable example for ball joint 610 is the MH 1004 Mini Ball Head manufactured by Giottos.

Figure 7:
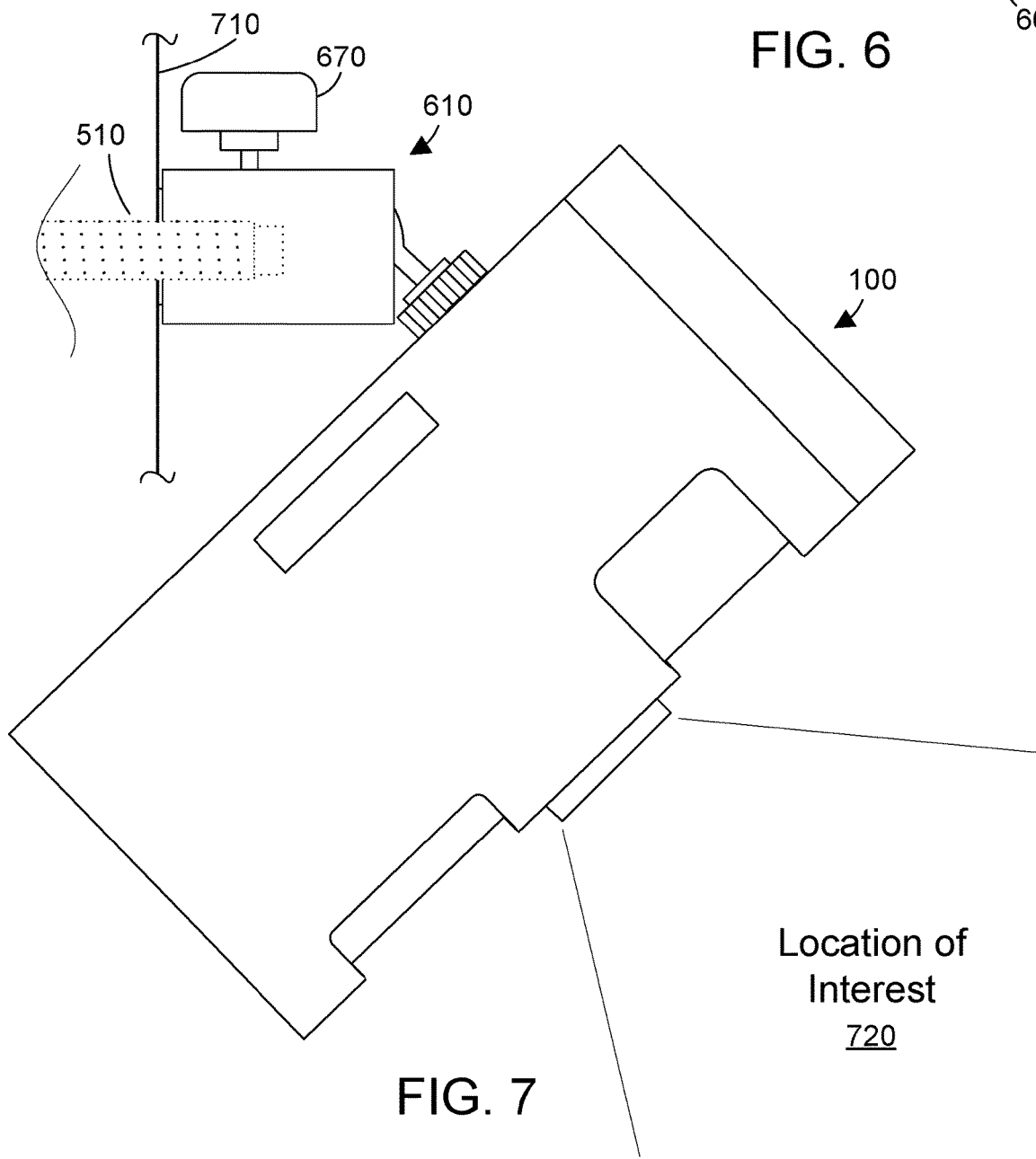
FIG. 7 is a side view showing how the camera in FIGS. 1-4 can be mounted in a fixed location in a wastewater pipe using the concrete anchor in FIG. 5 and the ball joint in FIG. 6.

Referring to FIG. 7, to mount the camera 100 in a fixed location so the camera can take photographs of a location of interest, a manhole cover is typically removed, a hole of the appropriate size is drilled in a concrete wall 710 with a cordless drill using a masonry bit, and the anchor end 520 of the concrete anchor 510 is then pounded into the hole, as partially shown at 510 in FIG. 5. The anchor is then secured in place, typically by turning a nut onto the threaded end 530 and turning the nut with a wrench until the anchor end 520 is securely anchored in the hole. Once the anchor 510 is securely anchored in the hole, as partially shown at 510 in FIG. 7, the threaded insert 630 of the ball joint 610 can be threaded onto the threaded end 530 of the anchor, as shown in FIG. 7. Once the ball joint 610 is secured in place to the anchor 510, the threaded insert 160 on the back of the camera 100 (shown in FIG. 2) is screwed onto the threaded post 660 of the ball joint 610, and the thumb wheel 650 can be turned to tighten the connection between the ball joint 610 and the camera 100. Once the camera is securely mounted to the threaded post 660, the knob 670 is loosened to allow the shaft of the ball joint to freely rotate, which allows the position of the camera 100 to be changed until the lens of the camera 100 is pointed to a location of interest 720. The process of pointing the camera 100 to the location of interest 720 is greatly simplified using laser 142 shown in FIG. 1. The laser 142 provides a colored dot of light that can be aimed at any suitable target in the location of interest to assure the camera is pointed at the location of interest. Once the camera 100 is pointed to the location of interest 720, the knob 670 is tightened to lock the camera in a fixed position with the lens pointed towards the location of interest 720. A nice feature of using the laser 142 is the ability to orient the camera in the same orientation time after time. A simple example will illustrate. Let's assume a person initially installs the camera as shown in FIG. 7, and uses the laser to point to a defined feature or point in the location of interest. The person could even mark the feature or point with a colored marker. The camera could be removed, then a year later the camera could be re-installed with the laser pointing to the same feature or point in the location of interest. The laser 142 thus provides precision in aiming the camera. Once the camera is re-installed and the laser 142 is pointed to the same point feature or point, the new photographs taken by the camera could then be compared with the photographs taken a year ago because the camera is pointing to the same feature or point in the location of interest.

While the installation shown in FIG. 7 shows installing the camera in a fixed location on a vertical surface near a manhole cover or pipe, the camera could be mounted on any suitable surface in any suitable orientation. For example, the camera could be mounted to the bottom surface of a manhole cover pointing straight down. In the alternative, the camera could be mounted to the bottom surface of a manhole cover pointing to an off-angle with respect to straight down. The manhole cover could then be rotated until the camera is pointed to the location of interest. One way to do this is to establish a wireless connection between the camera and a portable device such as a phone so what the camera is pointed to is visible on the portable device using an app on the portable device. When the camera includes a Wi-Fi interface, another way to do this is to establish a connection with the camera via its wireless interface, with the camera streaming video of what it currently sees so a user can determine whether the camera is pointed to the correct location of interest. Another way of mounting the camera uses a pressure bar, similar to a shower curtain rod, that pushes out between two opposing surfaces so the pressure bar can be mounted between two walls beneath the manhole cover. The camera could then be mounted to the pressure bar using any suitable connector. A pressure bar allows mounting the camera in a way that does no permanent damage to the manhole area. In addition, a pressure bar can be installed from outside the manhole without having to enter the confined space of the manhole. These and other variations for mounting the camera are within the scope of the disclosure and claims herein.

Figure 8:
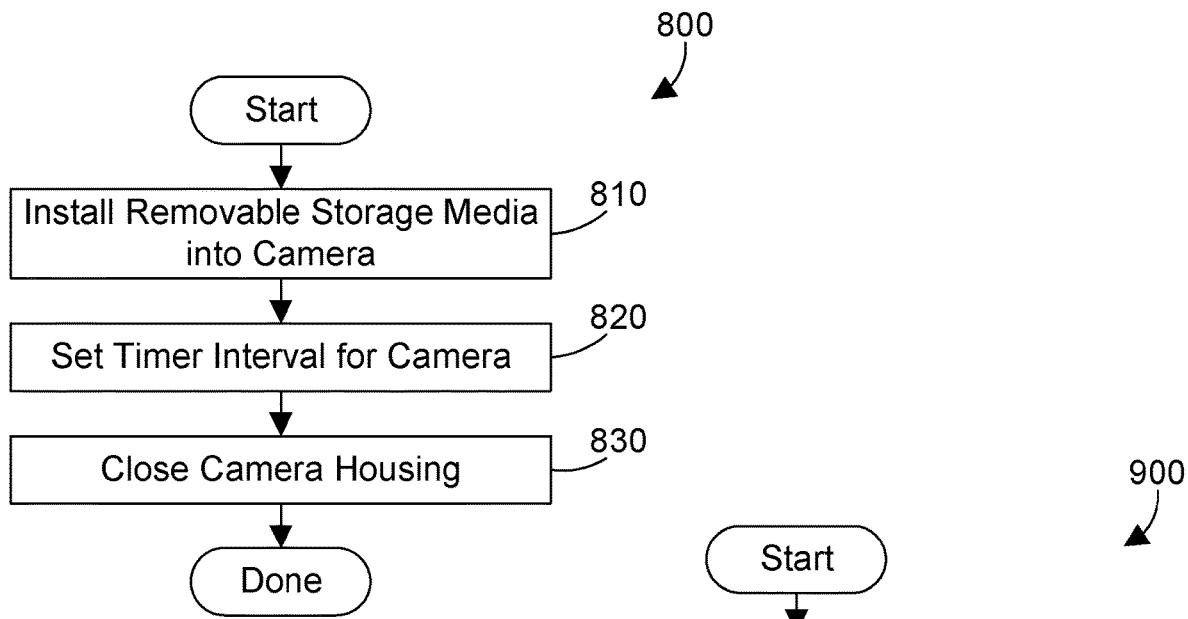
FIG. 8 is a flow diagram of a method for preparing a camera to monitor levels of wastewater in a wastewater pipe.

Referring to FIG. 8, a method 800 includes the steps for preparing a camera for use in the wastewater monitoring system. First, removable storage media is installed into the camera (step 810). The timer interval for the camera is set (step 820). The camera housing is then closed (step 830). The camera is ready to start taking photographs of the location of interest once the camera is mounted in the fixed location. For the specific example of the camera 100 in FIGS. 1-4, step 810 could include installing an SD card into the SD card slot 440 shown in FIG. 4. Step 820 would include the user setting the mode of the camera using the switch 460 and the buttons 450. Setting the camera to take a photograph every five minutes is one example of a suitable interval. The camera housing is closed in step 830 by installing the bottom cover 180 shown in FIG. 3.

Figure 9:
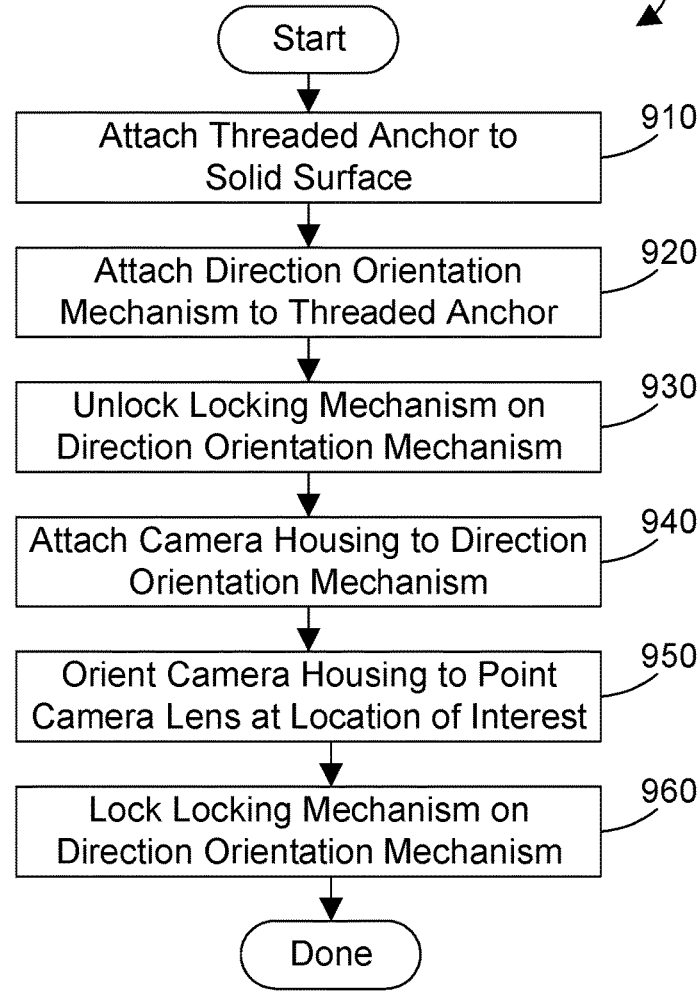
FIG. 9 is flow diagram of a method for installing a camera to monitor levels of wastewater in a wastewater pipe.

The steps for installing a camera in a fixed location are shown in method 900 in FIG. 9. The threaded anchor is attached to a solid surface (step 910). The direction orientation mechanism is attached to the threaded anchor (step 920). The locking mechanism on the direction orientation mechanism is unlocked (step 930), which allows a second part of the direction orientation mechanism to change position with respect to a first part of the direction orientation mechanism that is attached to the anchor. The camera housing is then attached to the direction orientation mechanism (step 940). The camera housing is then oriented to point the camera lens at a location of interest (step 950). The locking mechanism on the direction orientation mechanism is then locked (step 960), which locks the camera in a fixed location that points the camera lens at the location of interest. Method 900 is then done. The result if performing methods 800 and 900 shown in FIGS. 8 and 9, respectively, is illustrated in a camera 100 as shown in FIG. 7 that is mounted in a fixed position with respect to the location of interest 720.

Once the camera has been in place and taking photographs for a sufficient period of time, which can include days or weeks, the photographs need to be analyzed. To avoid the expense of having the camera communicate with some hard-wired or wireless communication system, the photographs may be retrieved from the camera by a person going to the location where the camera is mounted and retrieving the photographs. This can be done in different ways. When the camera includes removable media, such as a SD card, a thumb drive, or other removable media, method 1000 in FIG. 10 may be used. The person retrieving the photos opens the camera housing (step 1010). The removable storage media upon which the photos have been stored is removed from the camera (step 1020). A different removable storage media can be optionally installed into the camera (step 1030). The camera housing is then closed (step 1040). The person who removed the removable storage media can then transport the removable storage media with all its stored photos to a different location for analysis.

Instead of using a camera that has removable storage media, a camera could be used that stores the photographs in its internal memory. In this case, the camera could be removed and replaced with a similar camera so the camera's stored photographs can be analyzed. Referring to FIG. 11, method 1100 begins by the user opening the camera housing (step 1110). The user removes the camera from the housing (step 1120), installs a different camera into the housing (step 1130), and closes the camera housing (step 1140). The camera that has the stored images can then be transported to a different location for analysis while the new camera continues to take photographs of the location of interest.

In yet another implementation, the camera can include a wireless interface, such as a Bluetooth interface, a Wi-Fi interface, or a cellular network interface that allows the person to download the photographs from the camera to some external device. The photographs can be downloaded to a remote computer system, or can be downloaded to a portable device, such as a laptop computer, tablet computer, or smart phone that is in proximity to the camera. Referring to FIG. 12, method 1200 begins by establishing a wireless connection between a device that will receive the photos and the camera (step 1210). The photos are then transferred from the camera to the device via the wireless connection (step 1220). When the photos are transferred to a portable device, if the portable device has sufficient computing capacity and the proper software, the analysis of the photographs can be done directly by the portable device without transporting the portable device to a different location and without transmitting the photographs to a different location. In addition, in many circumstances the wireless interface may be available without removing the manhole cover. A simple example will illustrate. Let's assume the camera is installed in a manhole in the middle of a busy intersection. Assuming a portable device can access the wireless interface of the camera without removing the manhole cover, a person could stand on a street corner near the intersection and access the photographs in the camera using a portable device without the need of stopping traffic or removing the manhole cover. In the alternative, if the camera is able to connect to a suitable wireless connection such as a Wi-Fi network or a cellular network, the photos could be downloaded via the wireless connection to a remote device, such as a computer system.

Figure 13:
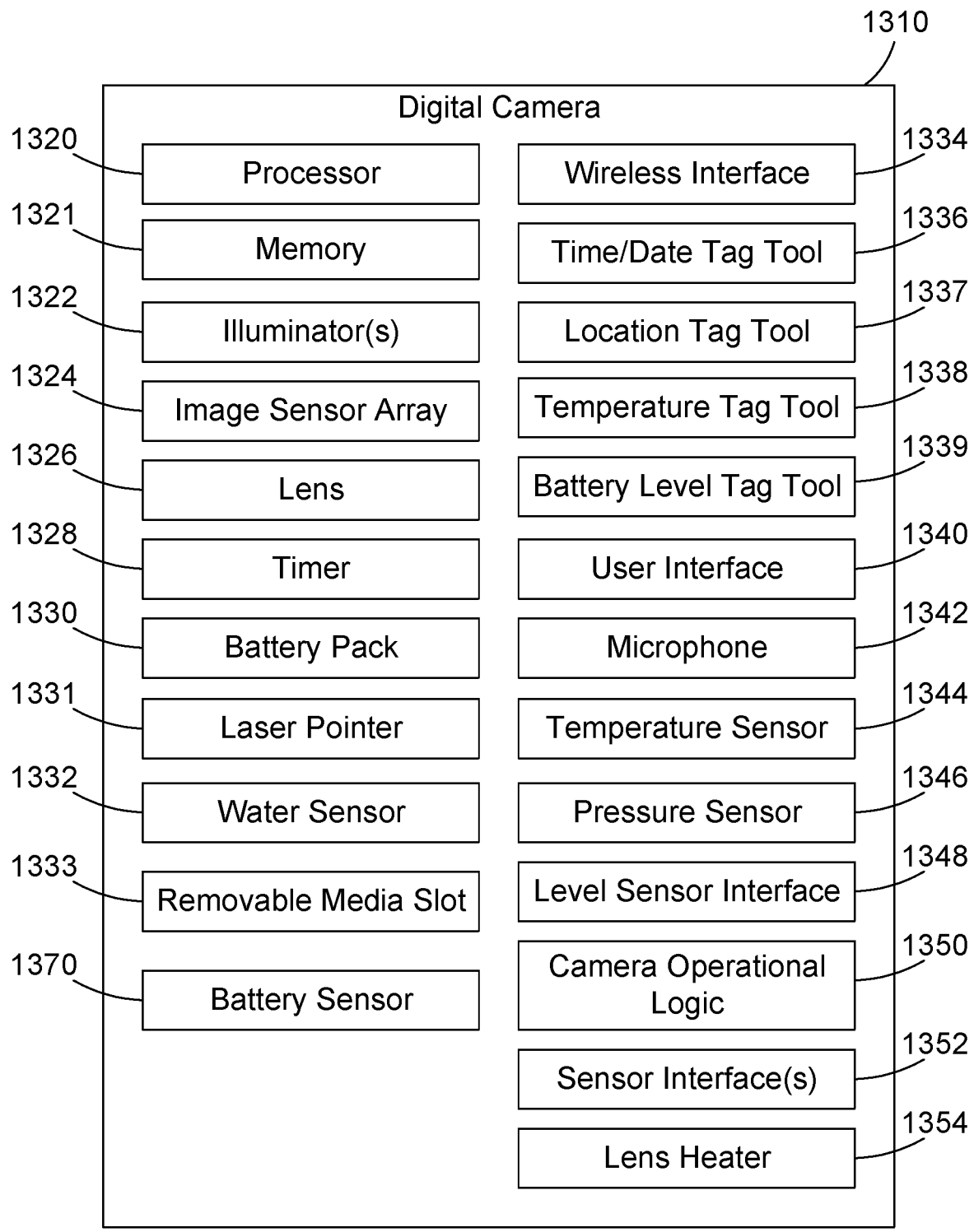
FIG. 13 is a block diagram of one suitable implementation for a digital camera that could be used in the wastewater monitoring system disclosed and claimed herein.

Referring to FIG. 13, a suitable digital camera 1310 could be used in the wastewater monitoring system disclosed and claimed herein. The digital camera 1310 includes a processor 1320; an internal memory 1321; one or more illuminators 1322; an image sensor array 1324; a lens 1326; a timer 1328; a battery pack 1330; a laser pointer 1331; a water sensor 1332, a removable media slot 1333; a battery sensor 1370; a wireless interface 1334; a time/date tag tool 1336; a location tag tool 1337; a temperature tag tool 1338, a battery level tag tool 1339, a user interface 1340; a microphone 1342; a temperature sensor 1344; a pressure sensor 1346; a level sensor interface 1348; camera operational logic 1350; one or more sensor interfaces 1352 that provide communication with one or more external sensors; and a lens heater 1354. The processor 1320 preferably executes the camera operational logic 1350 that resides in the memory 1321 to provide the control and processing function for taking and storing digital photographs, and for performing other camera functions disclosed herein. The illuminator(s) 1322 are preferably one or more light sources that can serve to illuminate a location of interest. Examples of suitable light sources include one or more light-emitting diodes (LEDs), which may include infrared LEDs, white LEDs, color LEDs, etc. When the illuminator(s) 1322 are white or color LEDs, the camera 1310 is preferably a color camera with a lens that filters infrared light. When the illuminator(s) 1322 are infrared LEDs, the camera could be a color camera, or is more preferably a black-and-white camera, with a lens that does not filter infrared light. The illuminator(s) 1322 are important in wastewater monitoring because wastewater pipes typically do not have sufficient light for a photograph without using an infrared illuminator. While illuminator(s) 1322 are shown in the figures and discussed herein, one skilled in the art will appreciate that any type of illuminator could also be used, including any suitable source of light. The image sensor array 1324 is an array of photo-sensitive devices, such as charge-coupled devices (CCDs) that allow taking a digital photograph, as is known in the art. The lens 1326 could be a fixed-focus lens, or could be an adjustable lens, where the lens directs an image to be taken as a photograph onto the image sensor array 1324. The lens 1326 could also be removable, allowing different lenses to be installed in camera 1310 depending on the field of view needed for a particular installation. The timer 1328 allows a user to set a time interval so the camera 1310 will take one photograph automatically each defined time period, such as five minutes. The battery pack 1330 can include any suitable direct current power source from any suitable battery chemistry or technology. The battery pack 1330 could be single-use, or could be rechargeable. The battery pack 1330 preferably provides sufficient power for the camera 1310 to function taking photographs for days, weeks or months without interruption. The term "battery pack" as used herein expressly includes any suitable type and size of commercially-available batteries, as well as battery types, forms and factors not yet known.

The laser pointer 1331 provides a visual indication such as a colored dot from a low-power laser that helps to point the camera lens at the location of interest. As discussed above, the laser pointer 1331 provides precision in pointing the camera so the camera can be repeatedly removed and installed to point to the same feature or point in the location of interest. This allows correlating photographs taken across multiple installations over time at the same location. The water sensor 1332 detects when water contacts the camera or the housing of the camera. For a camera similar to the camera shown in FIGS. 1-4 and 7, the water sensor 1332 could include two metal contact points on the case, where the water sensor 1332 detects electrical resistance between the two metal contact points. When water does not bridge the gap between the two metal contact points, the water sensor 1332 detects a very high electrical resistance, which means no water is present. When water bridges the gap between the two metal contact points, the water sensor 1332 detects a significantly lower electrical resistance, which means water is present. In an alternative implementation, the two metal contacts can be capacitive sense contacts that detect changes in capacitance between the two contacts. In some implementations, the water sensor would have metal probes on the exterior of the housing connected with wires to circuitry within the camera that would detect whether water is contacting the housing. The water sensor 1332 is especially useful in detecting an overflow condition where water is flooding up and out of the wastewater system through the manhole covers.

The removable media slot 1333 allows removable storage media to be installed into the camera 1310, which will result in photographs being stored on the removable storage media. Examples of removable media slot 1333 include an SD card reader that receives an SD card, and a USB port that receives a flash drive. All suitable types of removable media and corresponding slots are within the scope of the disclosure and claims herein.

The battery sensor 1370 senses the level of the battery pack 1330. The level of the battery pack can be reported in any suitable manner, such as a percentage from 1-100% of full charge, a bar graph, a bracketed value (such as 25%, 50%, 75% and 100%), or in any other suitable way.

The wireless interface 1334 can be used to connect the camera 1310 to a local or remote device for transferring the stored photographs to the device. A Bluetooth interface is one suitable example of a wireless interface 1334 when the photographs are to be transferred to a local device. A Wi-Fi interface is another suitable example of a wireless interface 1334, which is better suited than Bluetooth for sending the photographs to a remote device, such as a remote computer system. A cellular network interface is another suitable example of a wireless interface 1334. The loading of photographs from a camera to an external device via a wireless interface is discussed above with reference to method 1200 in FIG. 12. Note, however, the wireless interface 1334 could also be used to configure the camera operational logic 1350 so the user does not have to move switches or push buttons on the camera 1310 to put the camera 1310 in the desired mode of operation.

The time/date tag tool 1336 tags each photograph taken by the camera with the time and date of the photograph. The tagging of time and date for a photograph is most preferably done electronically by storing metadata that includes the time and date as part of the digital photograph file. In addition, the time and date could also be optionally superimposed on the photograph itself as visible text information so the time and date is visually apparent to a person viewing the photograph. The location tag tool 1337 could optionally tag each photo with the geographic location of the camera when the photograph was taken. The geographic location can be specified in any suitable way, including global positioning system (GPS) coordinates, or using any other way for specifying a geographic location, whether currently known or developed in the future. Note the camera need not include a GPS function to dynamically determine its location because the camera is mounted in a fixed location. Thus, the location of the camera could be specified to the camera at the time the camera is installed, which allows the location tag tool 1337 to tag each photo taken by the digital camera with the specified location. The temperature tag tool 1338 reads the temperature from the temperature sensor 1360, adds the temperature as metadata to the digital photograph file, and adds and overlays the temperature as visible information on the photograph, such as a numerical value or other representation of temperature. The battery level tag tool 1339 reads the battery level of the battery pack 1330 from the battery sensor 1370, adds the battery level as metadata to the digital photograph file, and adds and overlays the battery level as visible information on the photograph, such as a numerical value indicating a level of charge of the battery. The date and time, location, temperature and battery level can be added to one or more frames in a video stream captured by the camera in addition to being added to still photographs. Because a video stream is simply a sequence of photographs, the term "one or more photos" can include a single photo, multiple photos, or a video that includes multiple photos in time sequence.

The user interface 1340 allows the user to setup the camera 1310 to a desired mode of operation by defining the camera operational logic 1350, such as taking a photograph automatically every five minutes, or functioning as a slave to an external sensor. The user interface 1340 can optionally include a display that allows viewing the image captured by the camera, or viewing a video that shows what the camera sees, which can be very helpful in initially installing the camera. The microphone 1342 can be optionally used to change function of the camera 1310. For example, let's assume the camera 1310 is initially setup to take a photograph every five minutes. Let's further assume the camera monitors the ambient sound level using microphone 1342. When the ambient sound level detected by the microphone 1342 exceeds some specified threshold, which could indicate rushing water in the pipe, the camera function could change to take a photograph every minute instead of every five minutes. Because the camera 1310 is used to monitor level of water in a pipe, and because water makes sounds as it passes through a pipe, a change in the volume level detected by the microphone 1342 on the camera 1310 can indicate a change in the water level in the pipe, and could thus be used to change the function of the camera as desired or to tag one or more photographs according to detected sound levels.

The temperature sensor 1344 detects temperature at or near the location of interest. The temperature sensor 1344 could be a temperature sensor inside a housing for the digital camera 1310. In the alternative, the temperature sensor 1344 could be a remote temperature sensor connected to the digital camera. One suitable remote temperature sensor is a laser-type temperature sensor that detects temperature of a surface contacted with a laser. Such laser-type temperature sensors are available in most hardware stores at nominal cost, and could be built into the camera as shown in FIG. 13. The temperature sensor can provide a temperature in any suitable digital format in any suitable temperature units, such as Fahrenheit or Celsius. Because groundwater that leaks into a sewer system in infiltration or inflow is typically a different temperature than the material flowing in the sewer system, a rapid change in temperature can signal the presence of groundwater in the sewage pipe. In some applications or at some times of the year, the groundwater could be significantly warmer than the sewage in the sewer pipe. In other applications or at other times of the year, the groundwater could be significantly cooler than the sewer in the sewer pipe. When the camera detects via the temperature sensor 1344 a rate of change in temperature that exceeds some defined threshold over some defined time period, the camera could change its function. For example, the camera could be initially programmed to take one photograph every five minutes. But when the camera detects via the temperature sensor 1344 a change in temperature that exceeds the defined threshold over the defined time period, the camera could automatically change to taking one photograph every minute instead of every five minutes. The disclosure and claims herein expressly extend to suitably changing the function of a camera based on some detected temperature change.

The pressure sensor 1346 could be used to detect when the pressure at the camera increases. This could happen, for example, when the system backs up and overflows through the manhole covers. The pressure sensor 1346 allows the camera to detect when the pressure surrounding the camera or housing increases, thereby allowing the camera to alter its function, send an alarm, etc.

Figure 14:
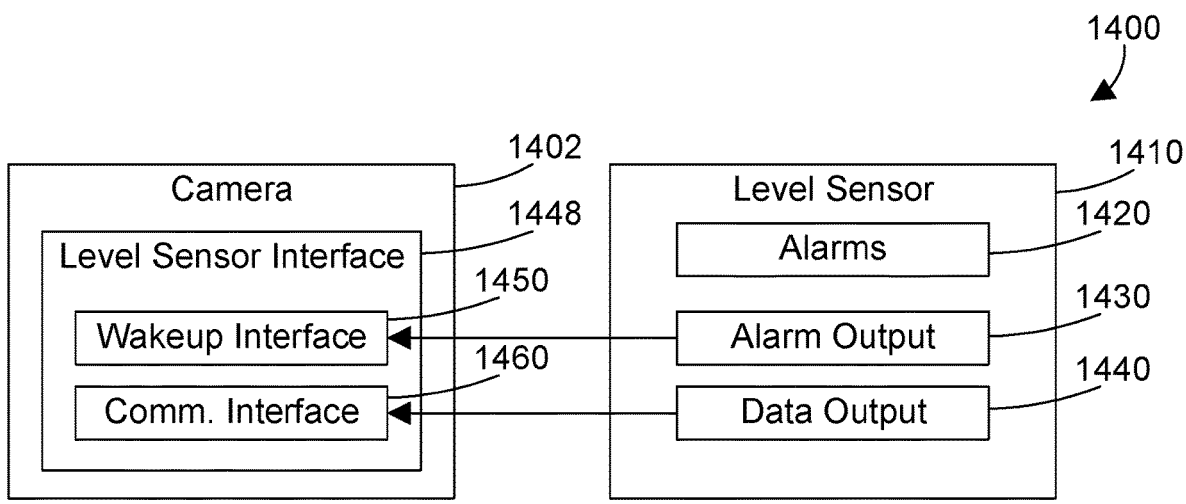
FIG. 14 is a block diagram showing one specific implementation for the level sensor interface shown in FIG. 13 connected to a level sensor.

The level sensor interface 1348 allows the camera to communicate with a suitable level sensor. One specific system 1400 that includes a suitable level sensor 1410 is shown in FIG. 14 that interacts with a suitable sensor level interface 1448, which is one suitable implementation for the sensor level interface 1338 shown in FIG. 13. Camera 1402 is one suitable implementation for camera 1310 in FIG. 13. A level sensor 1410 includes one or more alarms 1420 that may be programmed according to levels detected by the level sensor. The level sensor 1410 includes one or more alarm outputs 1430 that are connected to a wakeup interface 1450 in the level sensor interface 1448 in camera 1402. The wakeup interface 1450 can be any suitable implementation, such as a single digital line that is asserted by the alarm output 1430 to the wakeup interface 1450 to wake up the camera 1402, and de-asserted by the alarm output 1430 when the alarm has passed. The level sensor 1410 also includes a data output 1440 that allows communicating on any suitable communication interface, such as communication interface 1460 in camera 1402. In one specific configuration, the connection from the data output 1440 and communication interface 1460 is via a RS-485 serial interface that that supports serial communications on a two-wire serial half-duplex tri-state bus. The tri-state RS-485 bus allow connecting multiple cameras to one level sensor so an alarm in the level sensor can cause multiple cameras to wake up and take one or more pictures or a video. This approach allows multiple cameras to be slaves to a single level sensor, thereby providing different points of view for a location of interest. The level data received by each camera from the level sensor could be added and overlaid on all the photos as visible text, thereby allowing correlation of the photos from each camera to each other via the overlaid level data.

Eastech Flow Controls developed and sells a level sensor called the iTracker. Eastech Flow Controls has developed a modified iTracker to work with the digital camera disclosed herein. The references below to an iTracker are understood to mean a modified iTracker, as opposed to an off-the-shelf iTracker that is currently available. The modified iTracker is a self-contained level sensor that includes hard-wire connections that may be connected to the level sensor interface 1348 on camera 1310 in FIG. 13, or to the level sensor interface 1448 in camera 1402 in FIG. 14. The iTracker level sensor includes multiple alarm outputs 1430, and a two-wire RS-485 communication interface that communicates the data output 1440 to the communication interface 1460 in the level sensor interface 1448 in camera 1402 in FIG. 14. The iTracker level sensor further includes a Wi-Fi interface that allows communicating with the iTracker from a remote computer system via network communications over Wi-Fi.

Referring again to FIG. 13, the camera operational logic 1350 is software that resides in the memory 1321 and is executed by the processor 1320 so the camera will perform its desired functions. The camera operational logic 1350 supports communication with a level sensor via the level sensor interface 1348. The camera operational logic 1350 preferably performs method 1500 shown in FIG. 15 and method 2000 in FIG. 20, which are discussed below. In addition, camera operational logic 1350 may include logic to read binary sensors and to perform corresponding functions in response, as discussed in more detail below.

The sensor interface(s) 1352 represent any suitable interface to any suitable sensor or sensors that are external to the camera 1310. The level sensor interface 1348 is one specific example for the sensor interface 1352. The camera 1310 may function using inputs from many different sensors. As discussed in detail above, water sensor 1332, microphone 1342, temperature sensor 1344 and pressure sensor 1346 are examples of sensors that could be incorporated into the camera 1310. The level sensor interface 1348 and sensor interface 1352 provide interfaces to sensors external to the camera 1310. Note that any suitable sensor could be included as part of the camera 1310, as discussed above for the water sensor 1332, microphone 1342, temperature sensor 1344 and pressure sensor 1346. In the alternative, the sensor interface(s) 1352 could include interfaces to an external water sensor, an external microphone, an external temperature sensor, and/or an external pressure sensor. In addition, the sensor interface(s) 1352 could include an interface to any suitable sensor, whether currently known or developed in the future.

Because camera 1310 is used in a wastewater pipe, the humid environment can cause fogging of the lens of the camera due to condensation of water vapor on the lens. Camera 1310 preferably includes a lens heater 1354 that can heat the lens to eliminate any accumulated condensation on the lens. One specific implementation of the lens heater 1354 is placing the illuminator(s) 1322 in proximity to the lens so heat generated by the illuminator(s) 1322 can dissipate any accumulated condensation on the lens. Another implementation of the lens heater is a nichrome wire or other heating strip embedded in the lens or running around the periphery of the lens. By applying power to the nichrome wire, the lens is heated to eliminate any accumulated condensation. Other types of lens heaters are also within the scope of the camera disclosed herein, including heated fans and any other type of heater that could be used to heat the lens.

Note that a suitable digital camera that could be used in the wastewater monitoring system disclosed herein need not include all of the features shown in FIG. 13. A subset of these features could be used, depending on the specific implementation.

One possible mode of operation for the camera 1310 is to set a timer interval for taking photographs as shown in FIG. 8, which results in the camera taking one photograph each time period. It has been found in field testing of wastewater monitoring systems that battery life in the camera becomes a crucial, limiting factor in the system. When the camera is always on, with a timer counting down to taking the next photo, the battery life can affect the usability of the system. Using the iTracker level sensor, an alternative mode of operation for the camera 1310 is possible. In essence, the camera becomes a slave to the iTracker level sensor, only waking up when instructed by the iTracker level sensor. Thus, instead of programming the camera to take a photograph every five minutes, an alarm on the iTracker can be set to go off to wake up the camera every five minutes. This allows the camera to normally be in a deep sleep mode that greatly reduces battery drain. The camera wakes up when instructed by the iTracker, receives level data from the iTracker, takes a photo or video, overlays the level data received from the iTracker as visible text on the photo or video, then goes back into deep sleep mode. Note that when the camera takes a video, the video can include sound from the microphone 1342. Note also a combination of video and still photos can be taken by the camera. For example, at the start of an event indicated by an alarm, the camera could take ten seconds of video, then go into sleep mode, then take a single photograph each time the camera wakes up. These and other variations are within the scope of the disclosure and claims herein.

Figure 15:
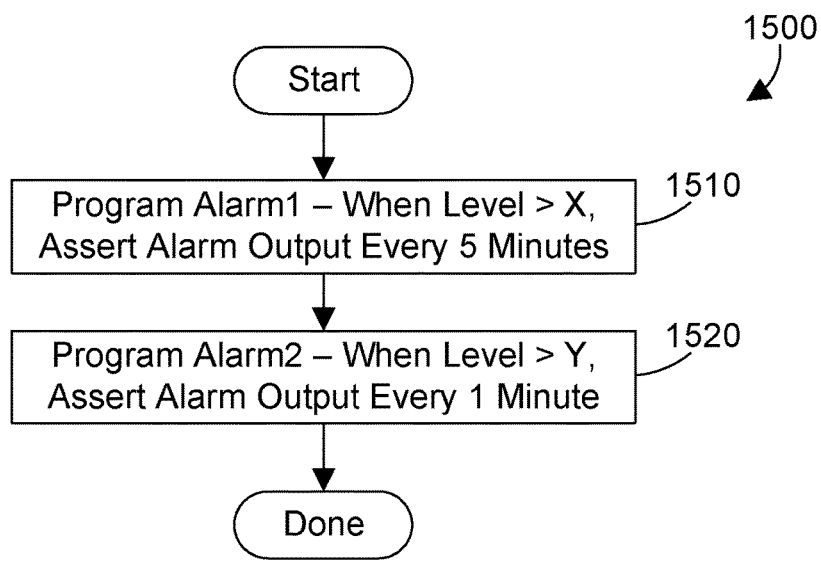
FIG. 15 is a flow diagram of a method for programming two different alarms into the level sensor in FIG. 14.
Figure 16:
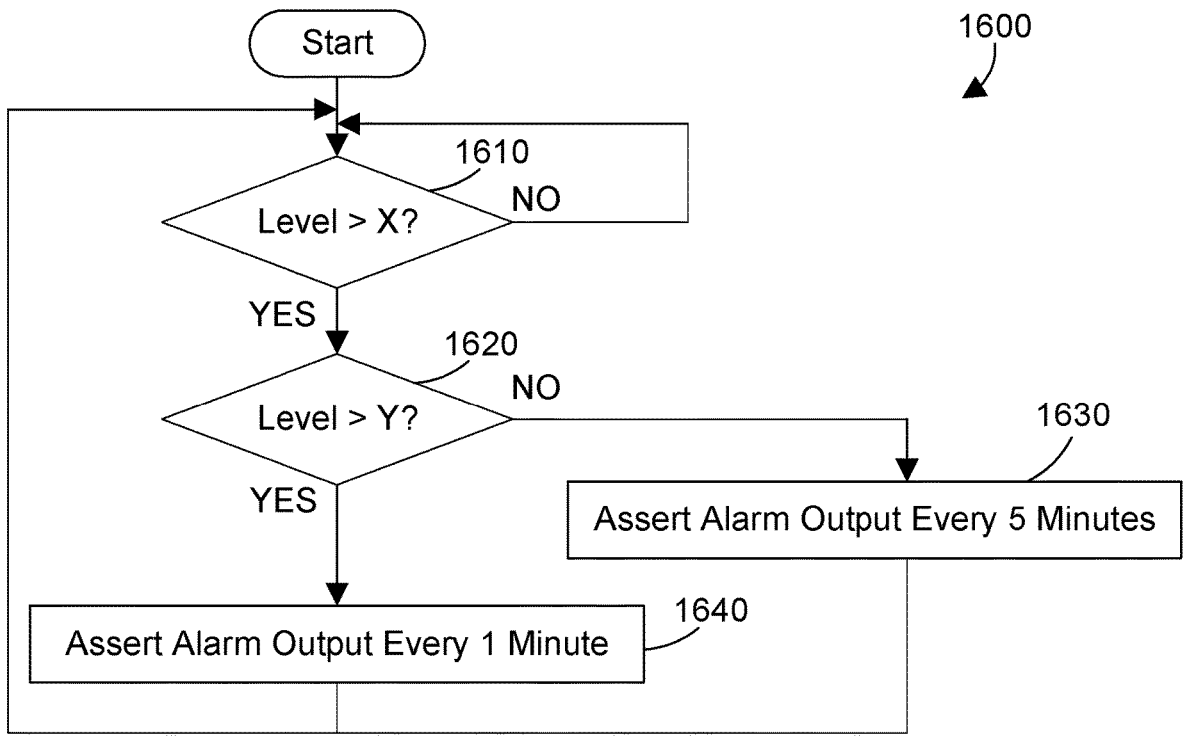
FIG. 16 is a flow diagram of a method for the level sensor in FIG. 14 to function according to the alarms programmed in FIG. 15.

FIG. 15 is a flow diagram of an example method 1500 for programming multiple alarms into a level sensor, such as an iTracker level sensor. For this specific example, the level sensor has a first alarm called Alarm1 that is programmed to be asserted every five minutes when the level detected by the level sensor is greater than a first defined threshold X (step 1510). The level sensor also has a second alarm called Alarm2 that is programmed to be asserted every one minute when the level is greater than a second defined threshold Y (step 1520). For this example, we assume the camera does not take any photos as long as the level is less than the first threshold X. Once the level exceeds the first threshold X but is less than the second threshold Y, the alarm output is asserted every five minutes. Once the level exceeds the second threshold Y, the alarm output is asserted every one minute. The logic here is clear. When the level is normal, no photos are taken because monitoring normal levels typically is not needed. When the level is between the first and second threshold, one photo every five minutes is taken. When the level is above the second threshold, one photo every minute is taken. This is shown as method 1600 in FIG. 16. When the level is not greater than the first threshold X (step 1610=NO), method 1600 loops back to step 1610 until the level exceeds this first threshold X (step 1610=YES). When the level is not greater than the second threshold Y (step 1620=NO), this means the level is between the first threshold X and the second threshold Y, so the alarm output is asserted every 5 minutes (step 1630). When the level is greater than the first threshold X (step 1610=YES) and greater than the second threshold Y (step 1620=YES), the alarm output is asserted every one minute (step 1640). The logic in the level sensor shown in FIGS. 15 and 16 allows the level sensor to monitor level of material in the wastewater pipe, then control the camera accordingly to preserve the battery life of the camera.

Figure 17:
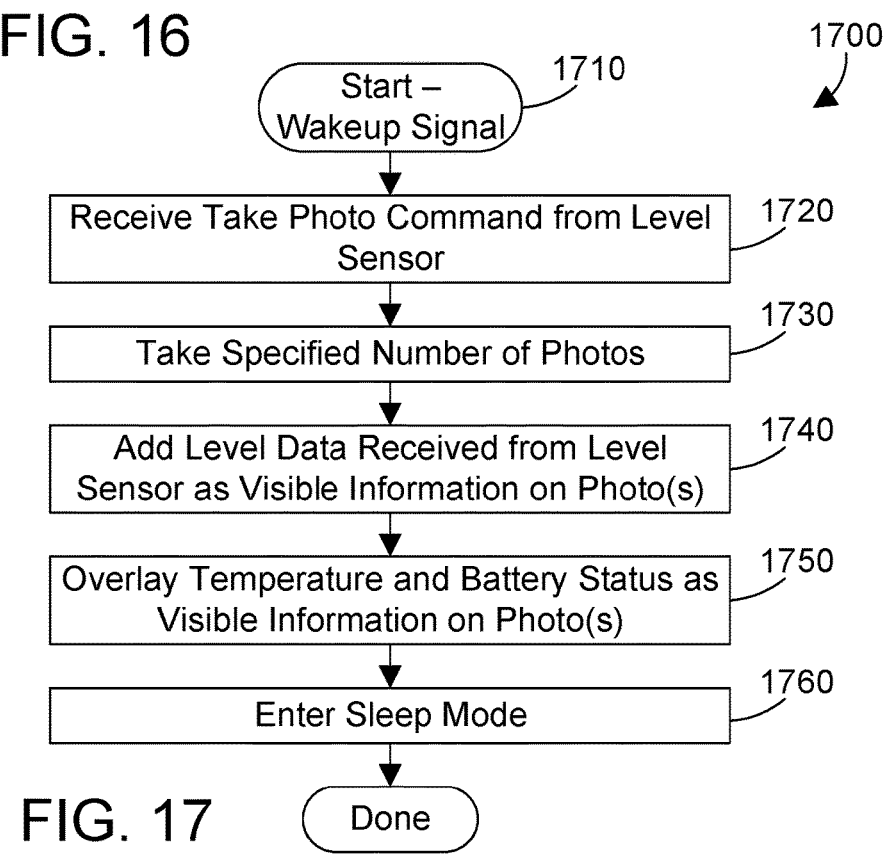
FIG. 17 is a flow diagram of one suitable method for the camera to function when woken up by the level sensor.

Referring to FIG. 17, a method 1700 represents steps performed by the camera operational logic. Method 1700 starts when camera 1310 receives a wakeup signal on its wakeup interface 1450 (step 1710). The cameral receives a "Take Photo" command from the level sensor (step 1720). In response, the camera takes a specified number of photos (step 1730), which can be a single photo, multiple photos, or a video. Level data received by the camera from the level sensor is added and overlaid as visible information on one or more of the photos or video (step 1740). Level data received from the level sensor that can be added to the photo(s) in step 1740 include time and date, location, and level determined by the level sensor. Note, however, that time and data and location could also be determined by the camera itself instead of being received as level data from the level sensor. Of course, other data could also be received from the level sensor and added to the photo(s) within the scope of the disclosure and claims herein. The temperature of the camera and battery status of the camera may also be added and overlaid as visible information on the photos (step 1750). The camera then enters sleep mode (step 1760) until it receives another wakeup signal (step 1710). By the camera waiting to be woken up by the level sensor before taking a picture, the camera's battery power is not wasted capturing images of normal conditions.

The number of photos taken in step 1730 can be specified as an operational parameter in the camera, or can be sent to the camera as a parameter to the command the camera receives from the level sensor to take a photo. In the most preferred implementation, the specified number of photos in step 1720 is one, which means the camera wakes up, takes one photo, adds the level data received from the level sensor and other data in steps 1740 and 1750 as visible information to the one photo, then goes back to sleep. Because the camera is only awake for a very short time each time it is woken up, the battery life is drastically improved, allowing a camera to function for many months, perhaps over a year, before battery replacement in the camera is required. While the default operation of the camera may be to take one photo when woken up, this default can be overridden by the wastewater control system interacting with the camera or the level sensor interacting with the camera to specify a number of photos greater than one that is taken each time the camera wakes up, or to specify a video be taken for a specified length of time.

Figure 18:
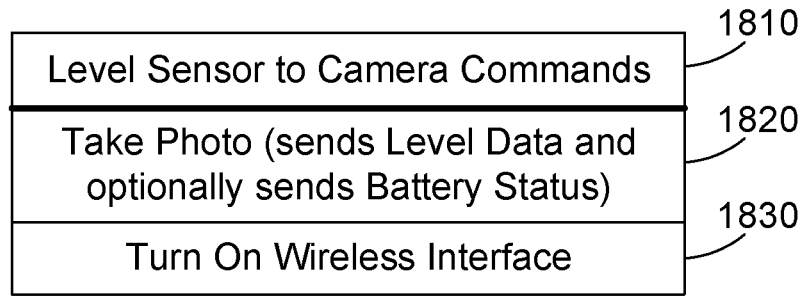
FIG. 18 is a table that shows examples of suitable commands from the level sensor to the camera.

Step 1720 in FIG. 17 refers to a Take Photo command. The Take Photo command is one suitable example of a level sensor to camera command, as shown at 1820 in table 1810 in FIG. 18. The Take Photo command 1820 instructs the camera to take one or more photos or a video, as discussed above. The Take Photo command 1820 may include a parameter that specifies a number of photos to take, or a length of video to take. However, as discussed above, the most preferred implementation is for the camera to take a single photo when it receives the Take Photo command 1820 from the level sensor. Note that the Take Photo command 1820 will be followed by the level sensor sending level data to the camera. The level sensor can also optionally send its battery status to the camera so the battery status of both the camera and the level sensor can be added and overlaid as visible information on the photo taken by the camera. A second command the level sensor can send to the camera is a Turn On Wireless Interface command 1830, which instructs the camera to turn on its wireless interface. As discussed above with reference to FIG. 13, a wireless interface can include any suitable wireless interface, whether currently known or developed in the future. Examples of known wireless interfaces include, without limitation, a Bluetooth interface, a Wi-Fi interface, and a cellular communication interface, or any combination of these. Once the camera turns on its wireless interface, the wastewater control system can interact directly with the camera to perform several functions, as discussed in more detail below, such as downloading photos from the camera directly at high speed.

The iTracker level sensor includes a Wi-Fi interface that turns on every five minutes to determine whether anything is trying to communicate with the iTracker level sensor. This feature allows the iTracker level sensor to further control the function of the camera, as shown in method 1900 in FIG. 19. The level sensor turns on its Wi-Fi interface every X minutes, such as five minutes (step 1910). The wastewater control system sends a message to the Wi-Fi interface of the level sensor until the message is acknowledged by the level sensor (step 1920), which happens once the level sensor turns on its Wi-Fi interface in step 1910, receives the message, and acknowledges the message. The level sensor sends a wakeup message to the camera (step 1930). The level sensor sends a camera command to the camera to turn on its wireless interface (step 1940). Method 1900 is then done.

Figure 19:
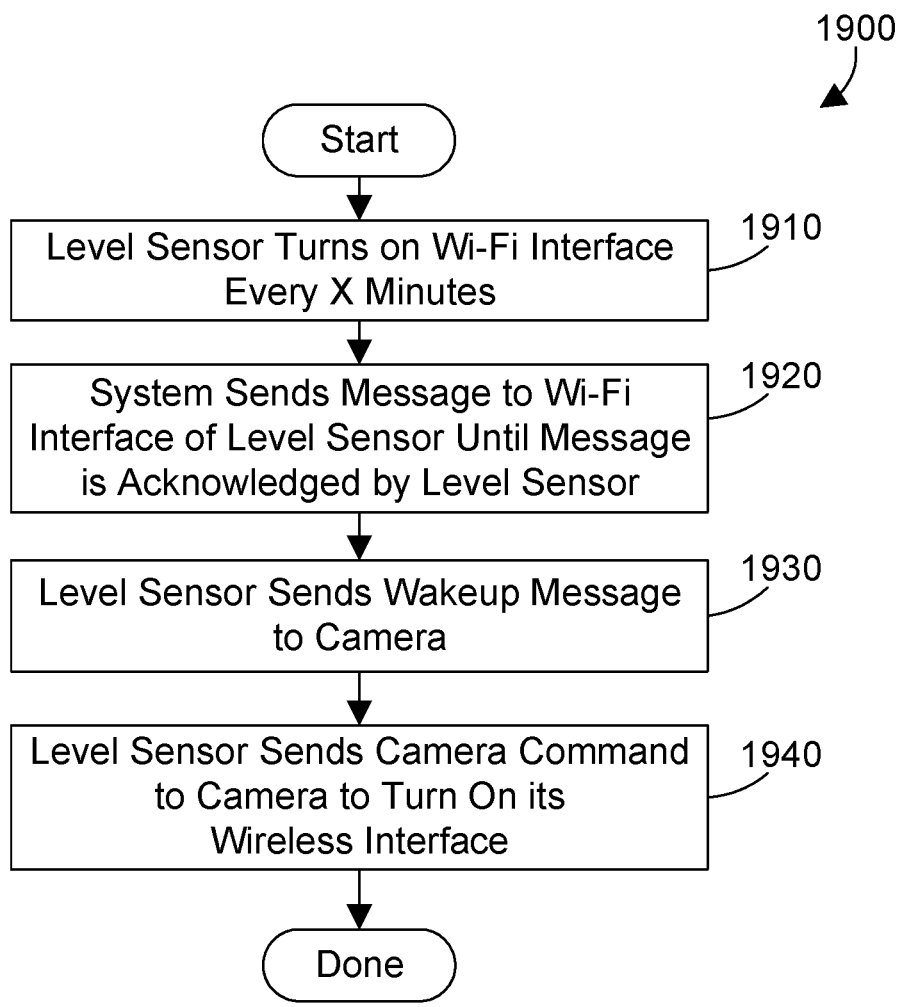
FIG. 19 is a flow diagram of a method showing interaction between a wastewater control system on a remote computer system, the level sensor and the camera.
Figure 20:
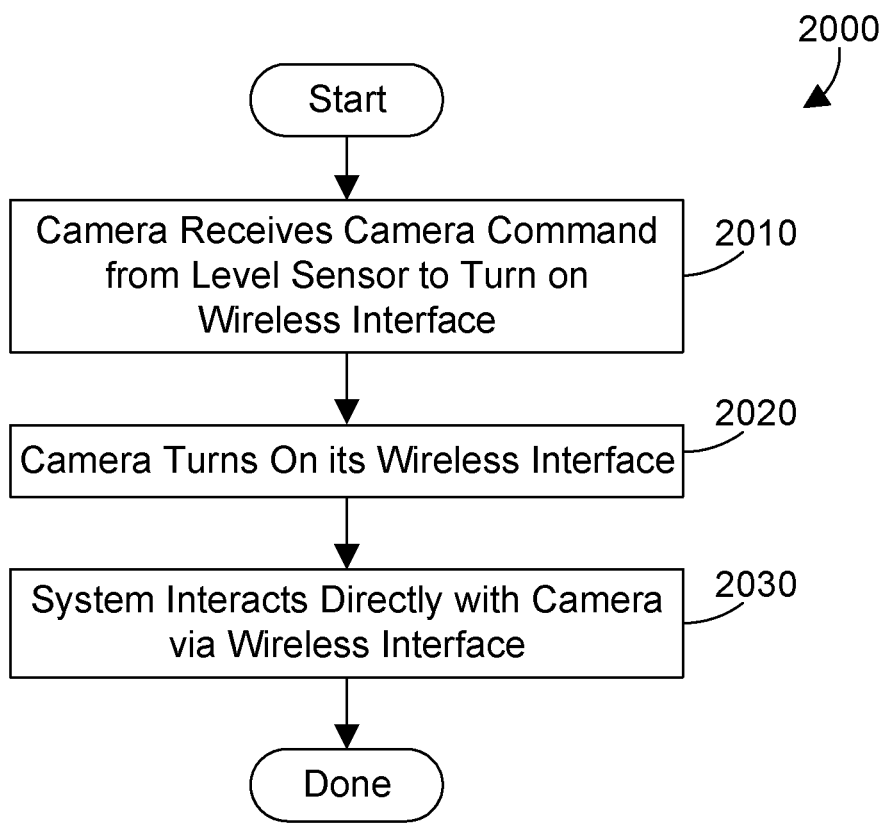
FIG. 20 is a flow diagram of a method for the wastewater control system to interact with the camera via the camera's wireless interface.

Method 2000 in FIG. 20 shows what happens in response to the camera receiving a camera command from the level sensor to turn on its wireless interface (step 2010), which occurs, for example, in step 1940 in FIG. 19. Referring back to FIG. 20, in response to the command received from the level sensor in step 2010, the camera turns on its wireless interface (step 2020). The wastewater control system can then interact with the camera directly via the wireless interface (step 2030), which allows the wastewater control system to interact with and control the camera. When the camera is connected to the wastewater control system via its wireless interface, the camera acts as a web server so the camera can be accessed and controlled via any suitable web browser. This eliminates the requirement for a specialized program to setup and control the camera. Of course, a specialized program could also be used, but the preferred implementation is for the camera to provide web server interface so any suitable browser can be used.

Figure 21:
FIG. 21 is a table that shows examples of suitable commands from the wastewater control system to the camera.

The wastewater control system can define any suitable command to interact with the camera. Examples of suitable commands from the wastewater control system to the camera are shown in table 2110 in FIG. 21, and include a Send Camera Status command 2120; a List Photos command 2130; a Send All Photos command 2140; a Send Specified Photos command 2150; a Delete All Photos command 2160; and a Delete Specified Photos command 2170. The Send Camera Status command 2120, when received by the camera, causes the camera to send any suitable status information, such as battery state, the amount of photo memory used, the amount of photo memory available, temperature, current operational settings, etc. The List Photos command 2130, when received by the camera, causes the camera to send to the wastewater control system a list of the photos in its memory. The Send All Photos command 2140, when received by the camera, causes the camera to send to the wastewater control system all the photos in its memory. The Send Specified Photos command 2150, when received by the camera, causes the camera to send to the wastewater control system a subset of specified photos in its memory. The photos may be specified in any suitable way in the Send Specified Photos command, including photo name, date, time, etc. The photos may also be specified using any suitable wildcard. Thus, one suitable example of a send specified photos command 2150 could specify to send all photos that begin with D456 in the filename that were taken between two specified dates. The Delete All Photos command 2160, when received by the camera, causes the camera to delete all photos in its memory. The Delete Specified Photos command 2170, when received by the camera, causes the camera to delete photos that match criteria in the command, similar to the criteria in the Send Specified Photos command 2150 discussed above. Of course, other system to camera commands could be included, and are within the scope of the disclosure and claims herein. In one suitable example, the wastewater control system could send a List Photos command 2130 to determine the list of stored photos in the camera, followed by a Send All Photos command 2140 to transfer all photos stored in the camera to the wastewater control system, followed by a Delete All Photos command 2160 to delete the photos stored in the camera after they are successfully transferred to the wastewater control system.

Providing a camera that is controlled by a level sensor such as an iTracker provides some significant advantages. By making the camera a slave to the iTracker level sensor, the battery life of the camera is significantly improved. The camera need not turn on its wireless interface to communicate with the wastewater control system until the iTracker sends a command for the camera to turn on its wireless interface. Once the camera turns on its wireless interface, the wastewater control system can interact with the camera to check status, retrieve photos, delete photos, etc. The result is an efficient wastewater monitoring system that is very simple to program and use and is inexpensive when compared to systems that provide similar functionality.

Figure 22:
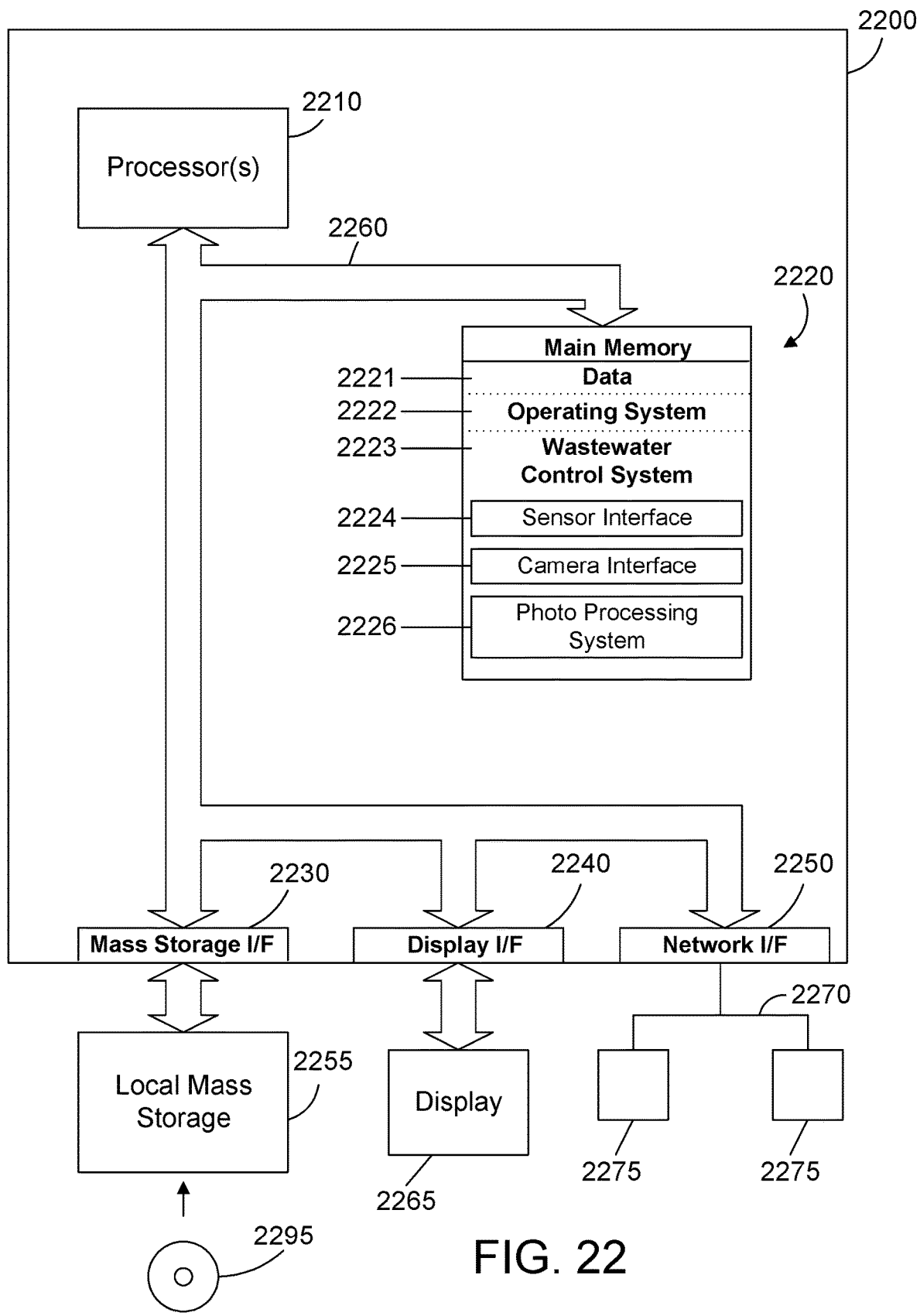
FIG. 22 is a block diagram of a computer apparatus that includes a wastewater control system that can communicate with sensors, cameras, and that processes the photographs retrieved from a camera in a wastewater pipe.

The photographs retrieved from a camera can be received and processed on a separate computer system, such as a desktop or laptop computer system. Referring to FIG. 22, computer system 2200 is representative of any suitable computer system that could communicate with a sensor, communicate with one or more cameras, and analyze photographs, including without limitation a desktop computer, a laptop computer, a tablet computer, and a smart phone. Computer system 2200 could be, for example, a Window-based computer system. However, those skilled in the art will appreciate that the disclosure herein applies equally to any computer system, regardless of whether the computer system is a complicated multi-user computing apparatus, a single user workstation, or an embedded control system. As shown in FIG. 22, computer system 2200 comprises one or more processors 2210, a main memory 2220, a mass storage interface 2230, a display interface 2240, and a network interface 2250. These system components are interconnected through the use of a system bus 2260. Mass storage interface 2230 is used to connect mass storage devices, such as local mass storage device 2255, to computer system 2200. One specific type of local mass storage device 2255 is a readable and writable CD-RW drive, which may store data to and read data from a CD-RW 2295.

Main memory 2220 preferably contains data 2221, an operating system 2222, and a wastewater control system 2223. Data 2221 represents any data that serves as input to or output from any program in computer system 2200. Operating system 2222 is a multitasking operating system. Wastewater control system 2223 is computer software that includes a sensor interface 2224 for communicating with one or more sensors, such as level sensors discussed above, a camera interface 2225 for communicating with one or more cameras, and a photo processing system 2226 for processing photos received from one or more cameras. The camera interface 2225 allows communicating directly with a camera, such as via a suitable wireless interface. This allows the wastewater control system 2223 to see what the camera sees, and to change or adjust the function of the camera. For example, the brightness of the illuminator(s) in the camera could be reduced while increasing the brightness of the camera exposure, to preserve battery life of the camera. In addition, the wastewater control system 2223 can see what the camera sees by the camera streaming live video to the camera interface 2225. This allows remotely determining the quality of the photographs or video being taken by the camera, and adjusting one or more parameters that control the function of the camera, as needed.

Computer system 2200 utilizes well known virtual addressing mechanisms that allow the programs of computer system 2200 to behave as if they only have access to a large, contiguous address space instead of access to multiple, smaller storage entities such as main memory 2220 and local mass storage device 2255. Therefore, while data 2221, operating system 2222, and wastewater control system 2223 are shown to reside in main memory 2220, those skilled in the art will recognize that these items are not necessarily all completely contained in main memory 2220 at the same time. It should also be noted that the term "memory" is used herein generically to refer to the entire virtual memory of computer system 2200, and may include the virtual memory of other computer systems coupled to computer system 2200.

Processor 2210 may be constructed from one or more microprocessors and/or integrated circuits. Processor 2210 executes program instructions stored in main memory 2220. Main memory 2220 stores programs and data that processor 2210 may access. When computer system 2200 starts up, processor 2210 initially executes the program instructions that make up operating system 2222. Processor 2210 also executes the wastewater control system 2223.

Although computer system 2200 is shown to contain only a single processor and a single system bus, those skilled in the art will appreciate that a wastewater control system as described herein may be practiced using a computer system that has multiple processors and/or multiple buses. In addition, the interfaces that are used preferably each include separate, fully programmed microprocessors that are used to off-load compute-intensive processing from processor 2210. However, those skilled in the art will appreciate that these functions may be performed using I/O adapters as well.

Display interface 2240 is used to directly connect one or more displays 2265 to computer system 2200. These displays 2265, which may be non-intelligent (i.e., dumb) terminals or fully programmable workstations, are used to provide system administrators and users the ability to communicate with computer system 2200. Note, however, that while display interface 2240 is provided to support communication with one or more displays 2265, computer system 2200 does not necessarily require a display 2265, because all needed interaction with users and other processes may occur via network interface 2250.

Network interface 2250 is used to connect computer system 2200 to other computer systems or workstations 2275 via network 2270. Network interface 2250 broadly represents any suitable way to interconnect electronic devices, regardless of whether the network 2270 comprises present-day analog and/or digital techniques or via some networking mechanism of the future. Network interface 2250 preferably includes a combination of hardware and software that allows communicating on the network 2270. Software in the network interface 2250 preferably includes a communication manager that manages communication with other computer systems 2275 via network 2270 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 2250.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 23:
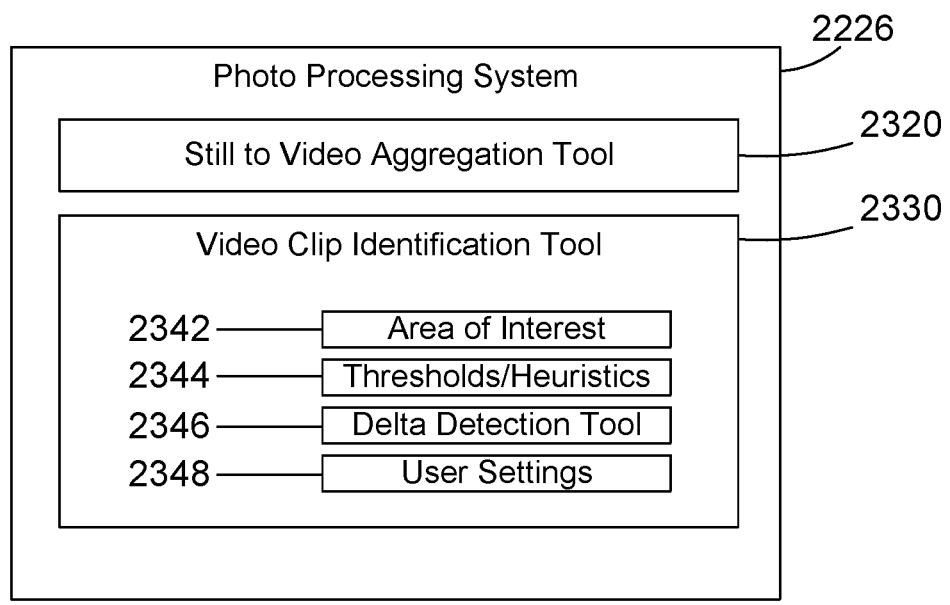
FIG. 23 is a block diagram showing suitable features of the photo processing system shown in FIG. 22.

FIG. 23 shows one specific implementation for the photo processing system 2226 shown in FIG. 22. The photo processing system 2226 is software that processes photographs taken by one or more installed cameras to help a user identify potential problems based on level of water in a pipe. The photo processing system 2226 includes a still to video aggregation tool 2320, and a video clip identification tool 2330. The still to video aggregation tool 2320 simply puts all of the photographs retrieved from an installed camera into time order in a video stream. Note, however, the video stream could include many hours of data that would be very tiresome for a human user to view. Even though the camera only took one photo each time interval, such as five minutes, the resulting video stream after aggregating the photographs over days or weeks could be many hours long. One of the helpful features of the photo processing system 2226 is to help identify video clips that may be of interest to the user. The video clip identification tool 2330 allows a user to define an area of interest 2342 on one of the photographs.

Once the area of interest is defined by the user, the video clip identification tool 2330 can use any suitable threshold or heuristic 2344 to compare photographs to determine which photographs have sufficient differences to merit viewing by a user. For example, the pixel values in a photograph could be compared to the pixel values in the preceding photograph in time. When a defined number of pixels in the area of interest are different than the corresponding pixels in the preceding photograph, the change can be detected by a delta detection tool 2346. The delta detection tool 2346 detects deltas, or changes, in a video stream based on a mathematical analysis that is performed using defined thresholds and/or heuristics 2344. The video clip identification tool 2330 also functions according to defined user settings 2348. The user settings 2348 provide a user with some adjustment capability for the photo processing system 2226. The user settings could include specifying a number of seconds or minutes to display before and after detected changes, how changes are detected, etc. Thus, in a first pass, the user could specify a relatively high threshold with a relatively short number of minutes before and after the changes to display. If the result is short video clips that do not provide enough information to the user, the user could then specify a lower threshold with a longer number of minutes before and after the changes to display. The user settings 2348 thus provide a way for the user to adjust the function of the photo processing system 2226 according to the user's preferences.

Figure 24:
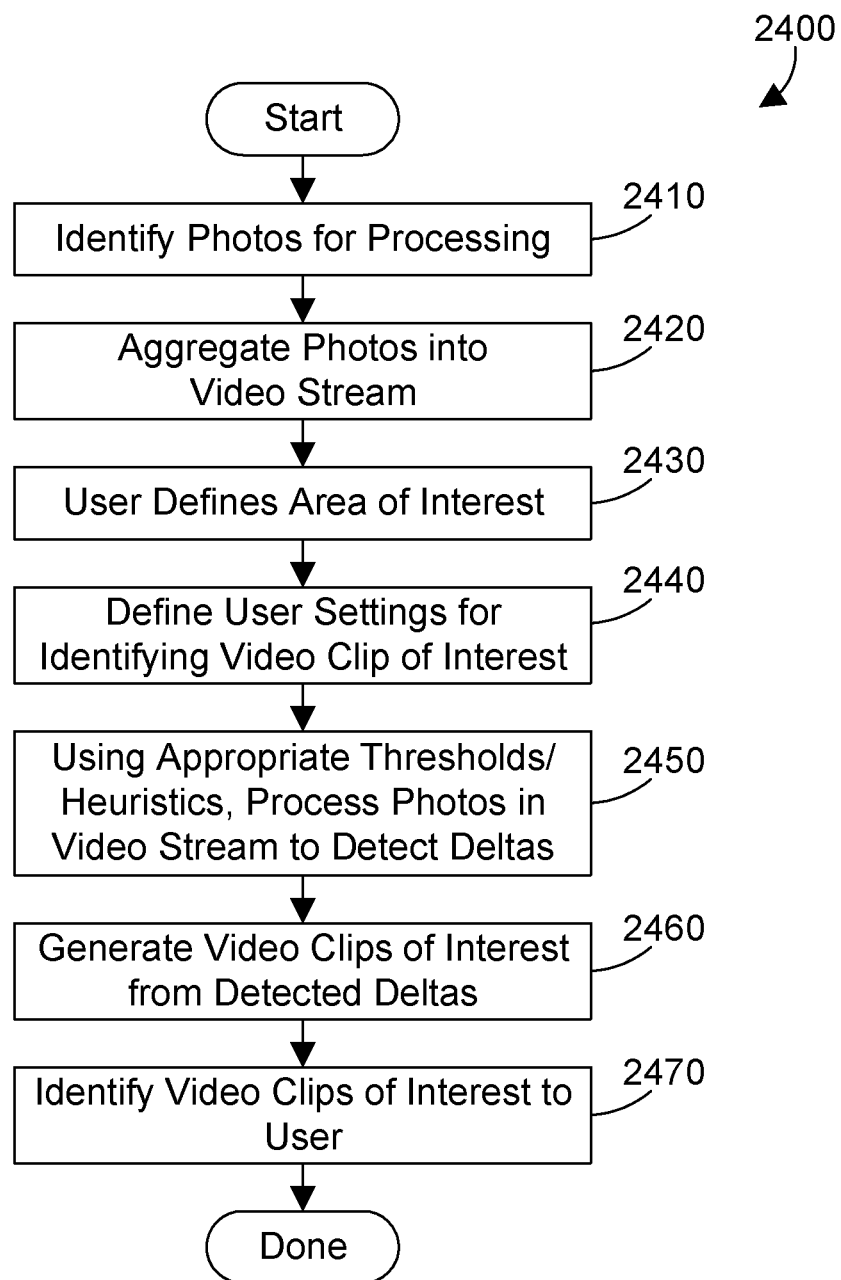
FIG. 24 is a flow diagram of a method for identifying video clips of interest to a user from a larger set of photographs using detected deltas (changes)

Referring to FIG. 24, a method 2400 represents steps that could be performed by the photo processing system 2226 shown in FIGS. 22 and 23. Photos are identified for processing (step 2410). One way to identify photos for processing is according to how the photos are stored. For example, photos stored on an external storage medium, such as an SD card, could all be identified as photos to be processed. Folders or directories could also identify photos for processing. Of course, the user could also use a software tool to identify photos for processing by selecting a group of photos for processing. The identified photos are aggregated into a video stream (step 2420). This could be done, for example, by the still to video aggregation tool 2324 in FIG. 23. The user then defines an area of interest (step 2430). The user can define an area of interest in any suitable way. For example, the user could allow the photo processing system to determine a normal flow area in most of the photographs, and define an area of interest to be anything outside the normal flow area. In the alternative, the user could use a mouse or other pointing device to graphically designate an area of interest, as illustrated below with reference to FIGS. 35-37. The user may also define user settings for identifying the video clip of interest (step 2440). Using appropriate thresholds, heuristics or other algorithms, the photos in the video stream are processed to detect deltas (or changes) (step 2450). Deltas are defined by differences between adjacent photos, and can be determined using any suitable function, including pixel color, pixel brightness, a histogram function, or any other suitable function for processing photographs. Once deltas are detected, one or more video clips of interest are generated from the detected deltas (step 2460). The video clips of interest are then identified to the user (step 2470). The user can then view the video clips of interest to determine water levels in the pipe being monitored at times when the water level changed. Method 2400 provides a significant advance over the known art by automatically filtering through a large number of photographs that are not statistically significant in determining differences in water levels and efficiently identifying video clips of interest that are most likely to show water levels of interest according to the detected deltas and the user settings.

Detecting deltas in step 2450 and generating video clips of interest in step 2460 may be done in any suitable manner. For example, two photographs could be identified that have the single biggest delta, and a video clip could be generated that includes a specified number of minutes or photographs before and after the detected delta. Another suitable way to detect deltas is using some average over a number of photographs. Thus, pixel values could be averaged over a sliding window of ten photographs, and when the next photograph processed has a delta that exceeds some threshold when compared to the average of the ten previous photographs, the delta can be marked, and a video clip of interest can be generated by including the delta and including a specified number of minutes or photographs before and after the detected delta. This includes computing an average pixel value over a predefined number of photographs and determining when a plurality of pixels in a photograph exceeds the computed average pixel value by some defined threshold. Of course, many other algorithms could be used to detect deltas and to generate from the detected deltas video clips of interest. The disclosure and claims herein expressly extend to any suitable manner for detecting deltas in a group of identified photographs, and to any suitable manner for generating video clips of interest from the detected deltas.

Figure 25:
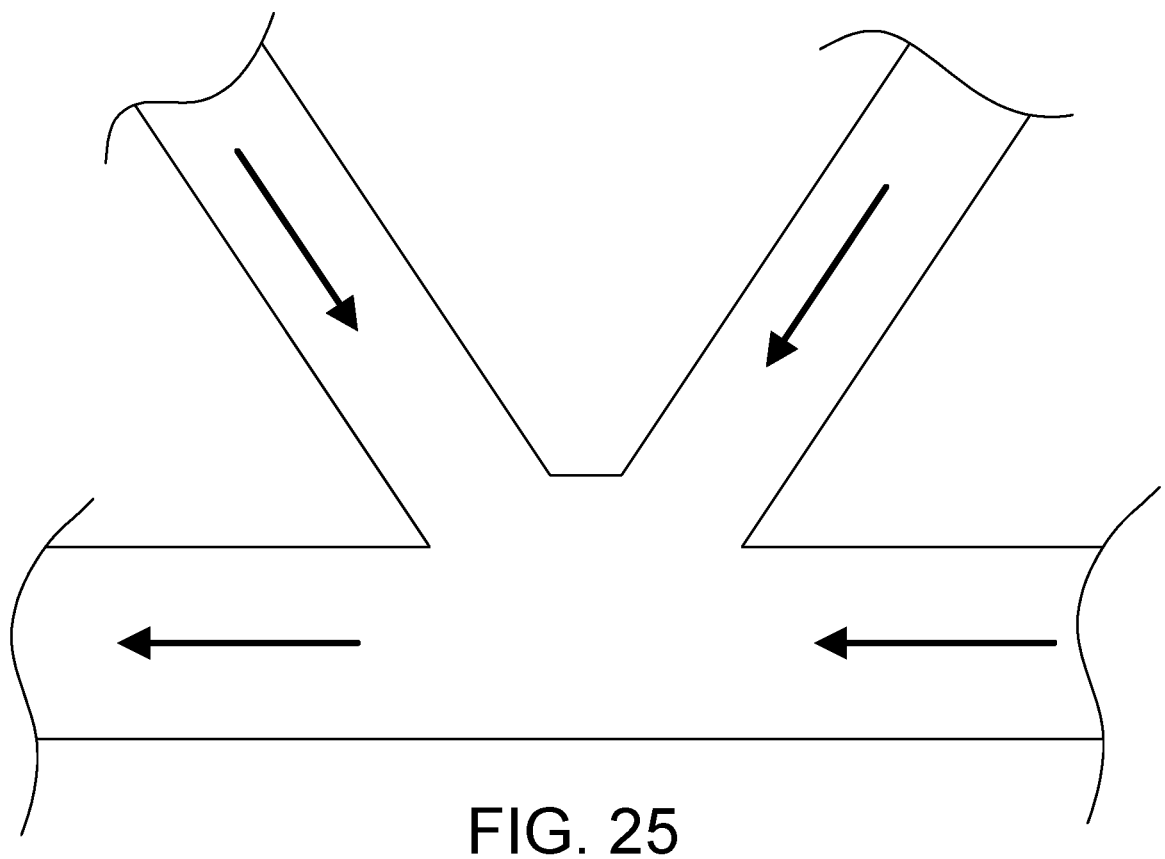
FIG. 25 is a sample wastewater junction that could be monitored using the wastewater monitoring system disclosed herein.
Figure 26:
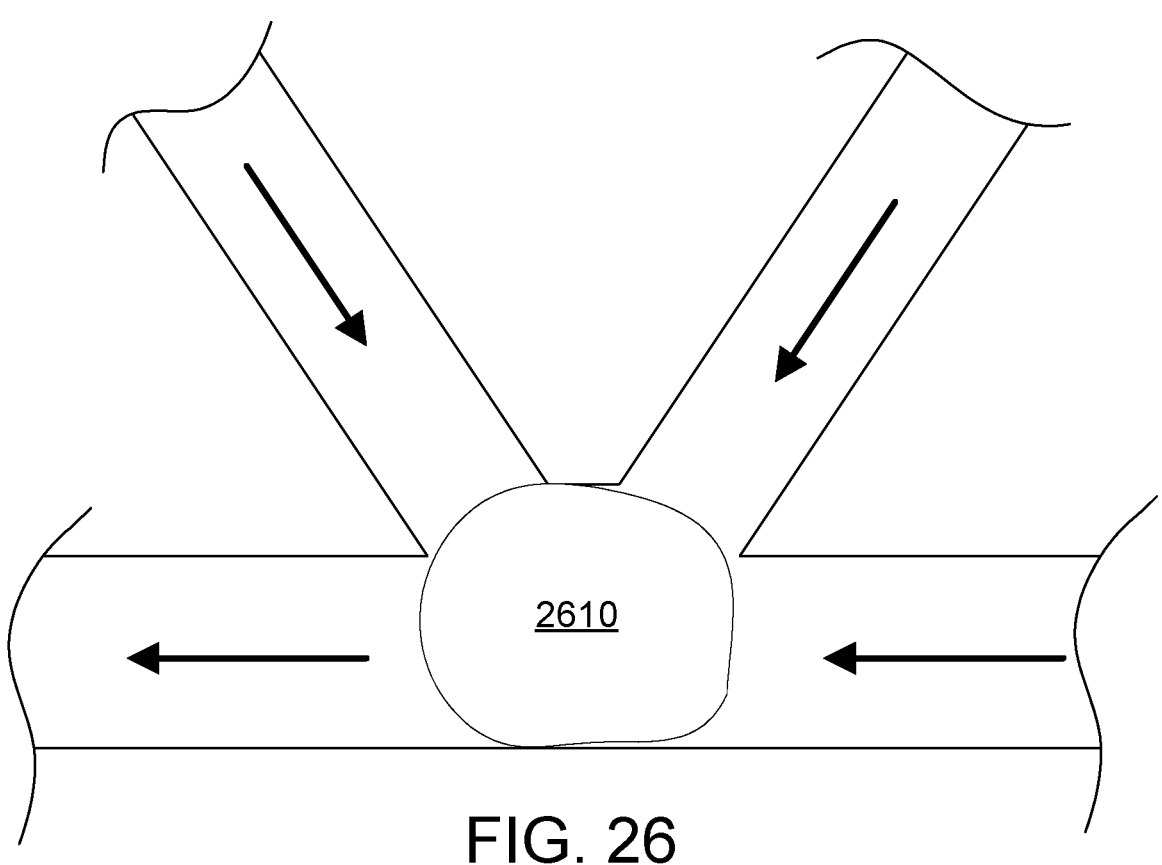
FIG. 26 shows how a user can define a first area of interest in the wastewater junction shown in FIG. 25.

One of the significant functions of the photo processing system is the ability to identify video clips of interest based on user settings and based on a defined area of interest. As discussed briefly above, the system can define an area of interest based on some mathematical or statistical analysis of the photos to be processed. In the alternative, the user can manually identify an area of interest. Referring to FIG. 25, we assume a camera is pointed towards a location of interest that includes three inflows and one outflow, as shown by the arrows in FIG. 25. Each photo will have some portions that do not change over time. For example, because the water levels in the pipes are of interest, all the areas between the pipes will not have any relevance to water levels in the pipes. Thus, the areas between the pipes could be ignored in the analysis. In addition, the user could use a mouse or other pointing tool to specifically identify one or more areas of interest. FIG. 26 shows an area of interest 2610 that was defined by a user using a mouse to draw a region that defines the area of interest 2610. Because this area of interest 2610 shown in FIG. 26 is the confluence of all three inflowing pipes to the one outflowing pipe, any change in the area of interest 2610 is likely to represent a change in water level. By defining area of interest 2610 in FIG. 26, the user can focus the analysis of the photo processing system on the area where changes are likely to be the most significant in relation to water level.

Figure 27:
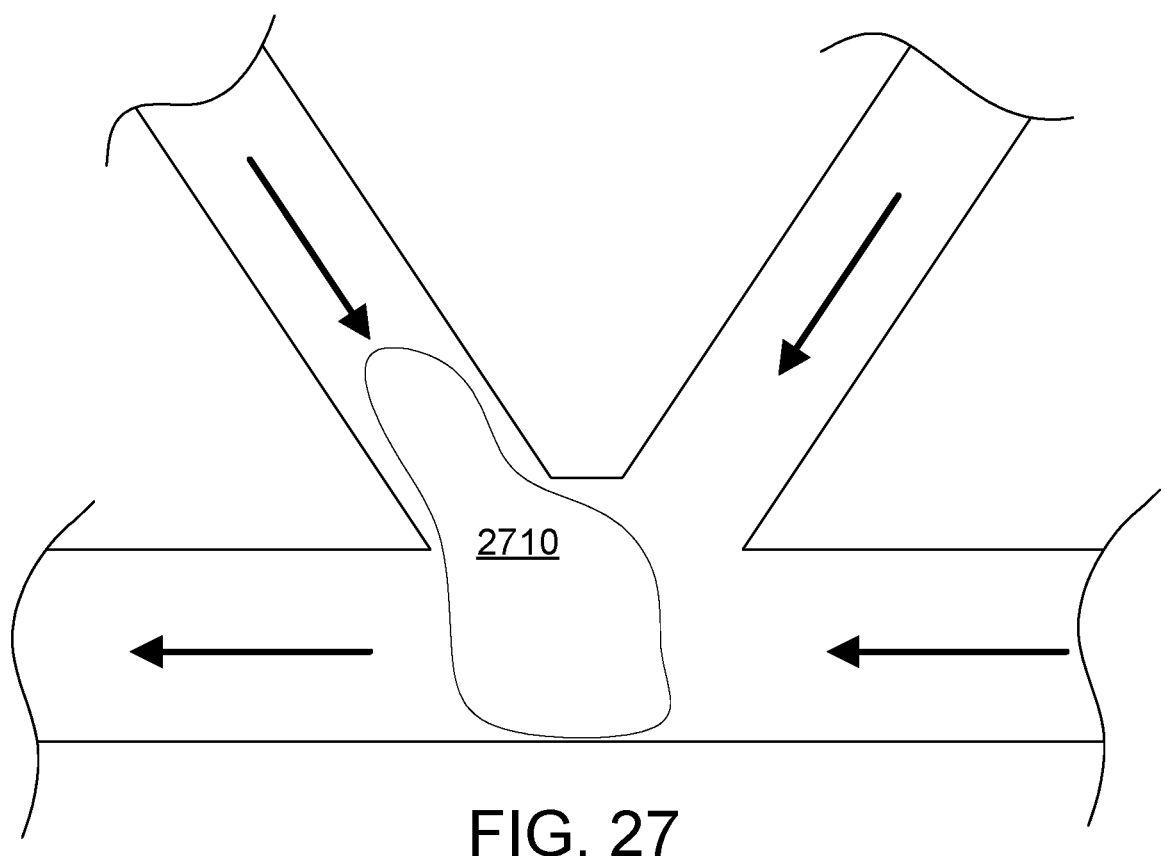
FIG. 27 shows how a user can define a second area of interest in the wastewater junction shown in FIG. 25.
Figure 28:
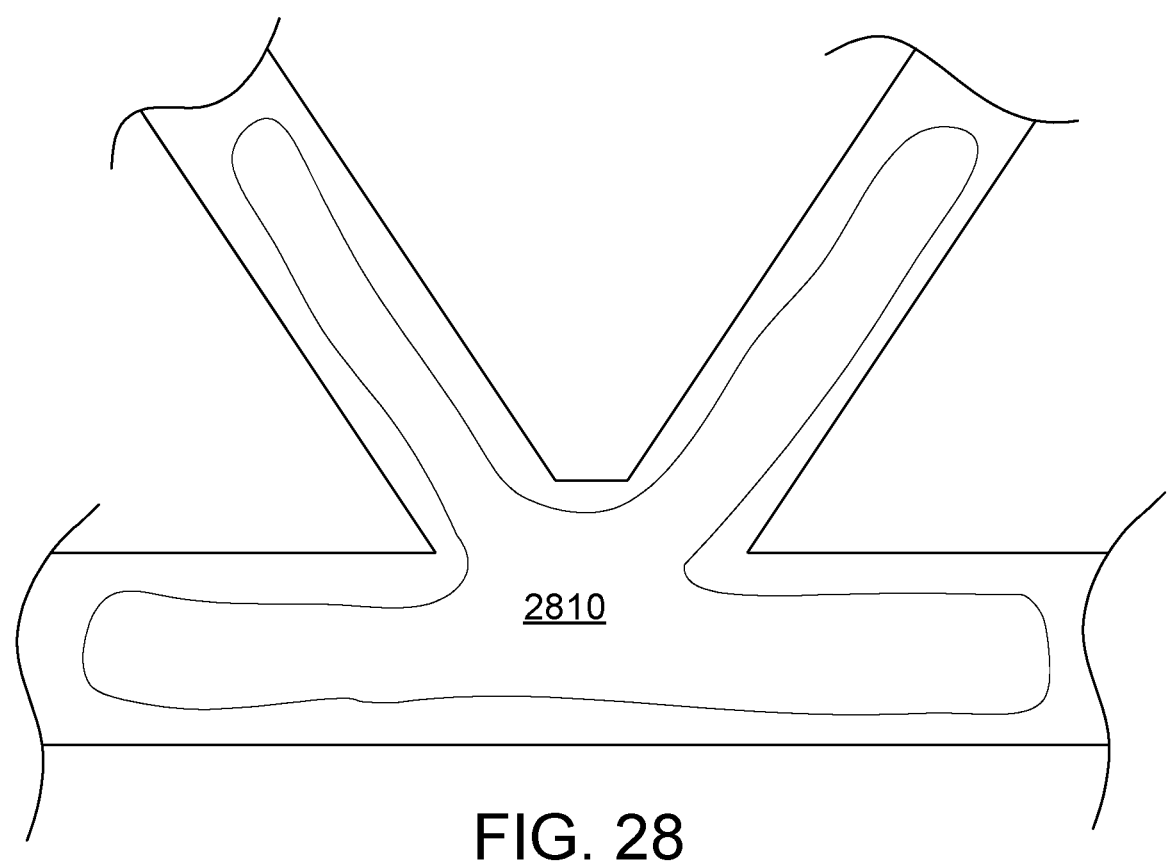
FIG. 28 shows how a user can define a third area of interest in the wastewater junction shown in FIG. 25.

FIG. 27 shows an alternative area of interest 2710 that could be defined by a user if the suspected leak is in the left-most inflow pipe, as shown in FIG. 27. Yet another way to define one or more areas of interest is by the user defining a normal flow region such as 2810 shown in FIG. 28, where everything outside the normal flow region 2810 is an area of interest. Notice that this is the opposite of what the user did in defining area of interest 2610 in FIG. 26 or 2710 in FIG. 27. Instead of outlining an area where differences in the water level are of interest, the user has defined in FIG. 28 an area where water levels are normal, thereby defining all areas outside the defined area 2810 as the areas of interest.

The wastewater monitoring system disclosed herein could be used in conjunction with other known sensors or products for monitoring wastewater systems, such as the iTracker level sensor discussed above. The wastewater monitoring system disclosed could receive an alert from the iTracker system, which could cause the wastewater monitoring system to begin taking photographs, to increase the time frequency of taking photographs, etc. Teledyne Isco makes area velocity flow modules that detect velocity of material in a pipe. Such a velocity flow module could send an alert to the wastewater monitoring system disclosed herein to cause a change in how the wastewater monitoring system functions. Thus, a wastewater monitoring system as disclosed herein could be installed in proximity to an area velocity flow module, and could be programmed to only take photographs when an enable signal is received from the system that includes the area velocity flow module. Of course, other functionality is also possible, such as increasing the frequency with which the wastewater monitoring system takes photographs when a given velocity threshold is exceeded by the area velocity flow module. Sensor interface(s) 1352 shown in FIG. 13 include any suitable interface to any suitable sensor that could be used with the wastewater monitoring system disclosed and claimed herein.

Figures 29, 30:
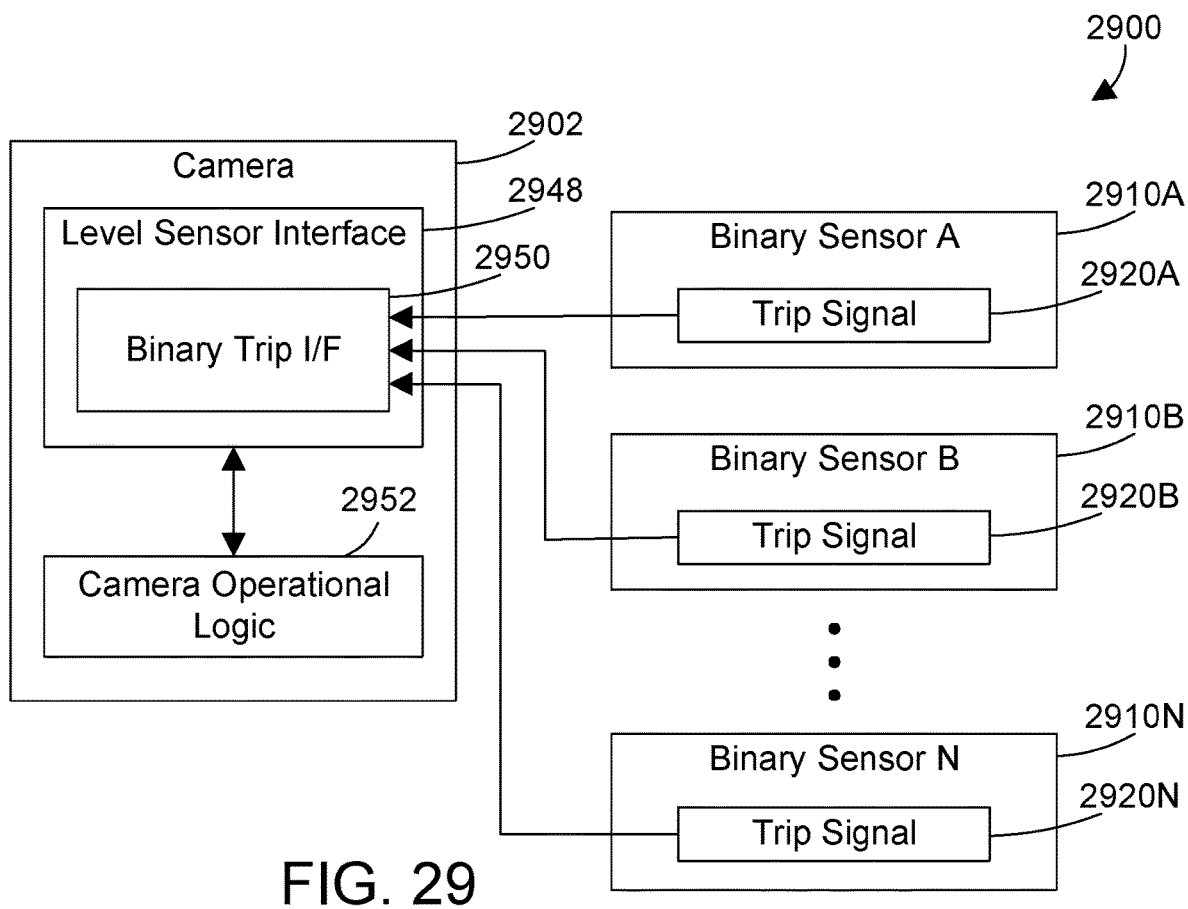
FIG. 29 is a block diagram of a system in accordance with a preferred embodiment.
FIG. 30 shows a table of binary sensors and corresponding binary trip actions.

Referring to FIG. 29, a system 2900 in accordance with a preferred embodiment includes a camera 2902 that includes a level sensor interface 2948 and camera operational logic 2952. The level sensor interface 2948 is one suitable implementation of the level sensor interface 1348 in FIG. 13, and the camera operational logic 2952 is one suitable implementation of the camera operational logic 1350 in FIG. 13. The level sensor interface 2948 includes a binary trip interface 2950 that includes one or more pin inputs that receive trip signals from one or more binary sensors, shown in FIG. 29 as binary sensor A 2910A, binary sensor B 2910B, . . . , binary sensor N 2920N. Each binary sensor 2910A, 2910B, . . . , 2910N provides a corresponding binary trip signal 2920A, 2920B, . . . , 2920N. Each binary sensor preferably drives its corresponding trip signal to one logic state when the binary sensor is in a first state, and drives its corresponding trip signal to a second logic state when the binary sensor is in a second state. The binary sensors can be any suitable type of sensor that can provide a binary output, including without limitation a float, a proximity sensor, and a flow sensor. A simple illustration will illustrate. Let's assume binary sensor A 2910A is a float that drives the trip signal 2920A to an inactive state when the float detects a level of liquid less than a specified threshold defined by the trip point of the float, and drives the trip signal 2920A to an active state when the float rises above the trip point of the float. Similarly, let's assume binary sensor A 2910A is a proximity sensor that drives the trip signal 2920A to an inactive state when the proximity sensor detects a level of liquid less than a specified threshold defined by the trip point of the proximity sensor, and drives the trip signal 2920A to an active state when the proximity sensor senses a level of liquid greater than the trip point of the proximity sensor. Let's assume binary sensor A 2910A is a flow sensor that drives the trip signal 2920A to an inactive state when flow sensor detects a flow rate less than a specified threshold flow defined by the trip point of the flow sensor, and drives the trip signal 2920A to an active state when the flow sensor senses a flow rate greater than the trip point of the flow sensor. Note the term "trip point" as used herein refers to a predetermined threshold that determines when the binary sensor switches the state of its corresponding trip signal.

The camera operational logic 2952 monitors the level sensor interface 2948, and when a trip signal from one of the binary sensors is detected, the camera operational logic takes appropriate action depending on the defined actions for each trip sensor. Referring to FIG. 30, a table 3010 shows that each binary sensor A, B, . . . , N has one or more corresponding actions. Thus, sensor A has one or more corresponding action(s) A, as shown at 3020A; sensor B has one or more corresponding action(s) B, as shown at 3020B, . . . , and sensor N has one or more corresponding action(s) N, as shown at 3020N in FIG. 30. The actions for each sensor are preferably programmed into the camera operational logic 2952 so the camera knows what action to take when the camera detects a sensor drives its trip signal active.

Figure 31:
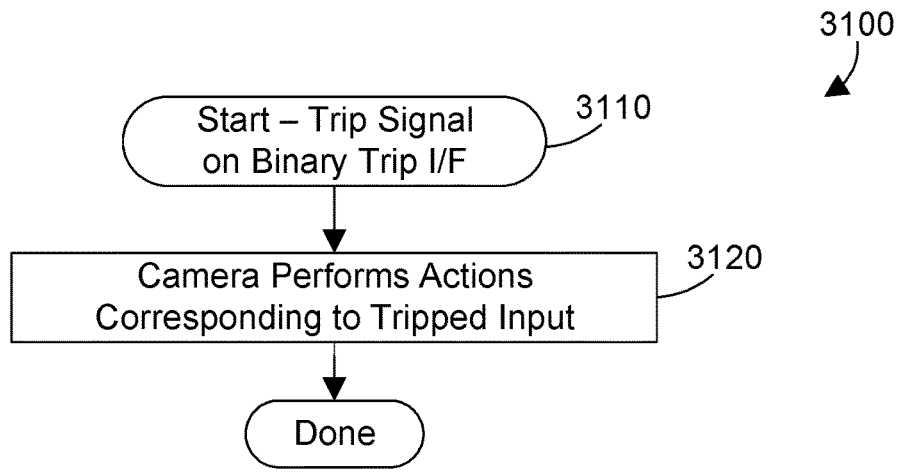
FIG. 31 is a flow diagram of a method in accordance with the preferred embodiments.

FIG. 31 shows a method 3100 that is performed when a trip signal is detected on the binary trip interface (step 3110). The camera performs one or more actions corresponding to the tripped input (step 3120). Method 3100 is then done. The actions that correspond to the tripped input could be specified or defined in any suitable way, such as in a table as shown in FIG. 30.

Figure 32:
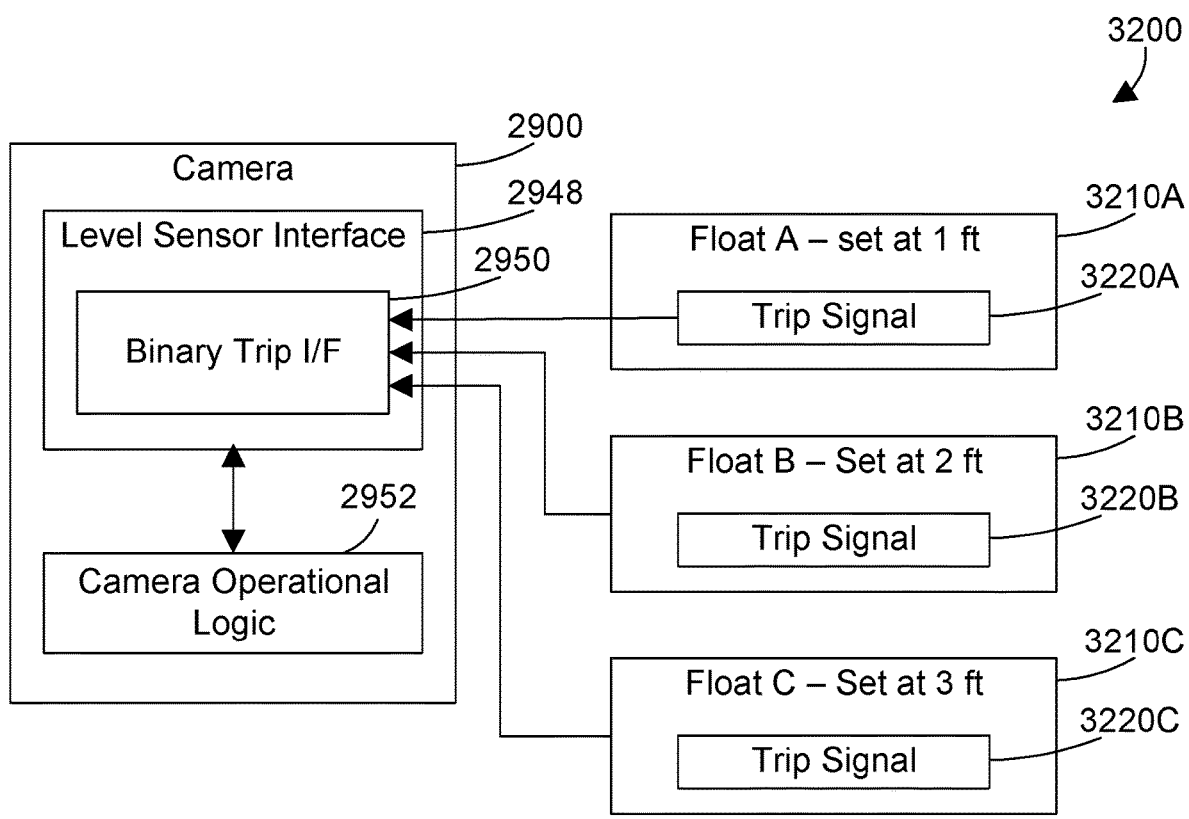
FIG. 32 is a block diagram of one specific system within the scope of the system shown in FIG. 29.

A specific example is now provided to illustrate some of the concepts discussed generally above. We assume for this example the system is installed to monitor level of wastewater in a four foot diameter pipe. Referring to FIG. 32, a sample system 3200 includes the camera 2900 as shown in FIG. 29 and described above. We assume this system has a first float A 3210A that is set to activate its trip signal 3220A when the level of water reaches 1 ft., a second float B 3210B that is set to activate its trip signal 3220B when the level of water reaches 2 ft., and a third float C 3210C is set to activate its trip signal when the level of water reaches 3 ft. Suitable camera operational logic is defined in table 3300 in FIG. 33 that dictates how the camera operational logic functions according to the state of the three floats in FIG. 32. When floats A, B and C are clear, meaning none of their trip signals are active, the level of the wastewater in the pipe is less than 1 ft., and the camera takes one picture every hour as shown at 3310 in table 3300. When float A is set, meaning its trip signal is active, but floats B and C are clear, meaning their trip signals are inactive, the level of wastewater in the pipe is greater than 1 ft. but less than 2 ft, and the camera takes a picture every 10 minutes, as shown at 3320. When floats A and B are set but float C is clear, the level of wastewater in the pipe is greater than 2 ft. but less than 3 ft, and the camera takes a picture every 1 minute, as shown at 3330. When floats A, B and C are all set, the level of wastewater in the pipe is greater than 3 ft, and the camera takes a picture every 10 seconds, as shown at 3340. The rate for the camera to take pictures can be thought of in terms of either the time interval between pictures, or a frequency of taking pictures. Note the frequencies shown in FIG. 33 could be normalized to the same units, such as minutes, which means 3310 would specify one picture every 60 minutes, 3320 would specify one picture every 10 minutes, 3330 would specify one picture every minute, and 3340 would specify one picture every ⅙ of a minute. When the number of pictures taken is a frequency, it is assumed in the most preferred embodiments the pictures are taken at even intervals at that frequency.

Figures 33, 34:
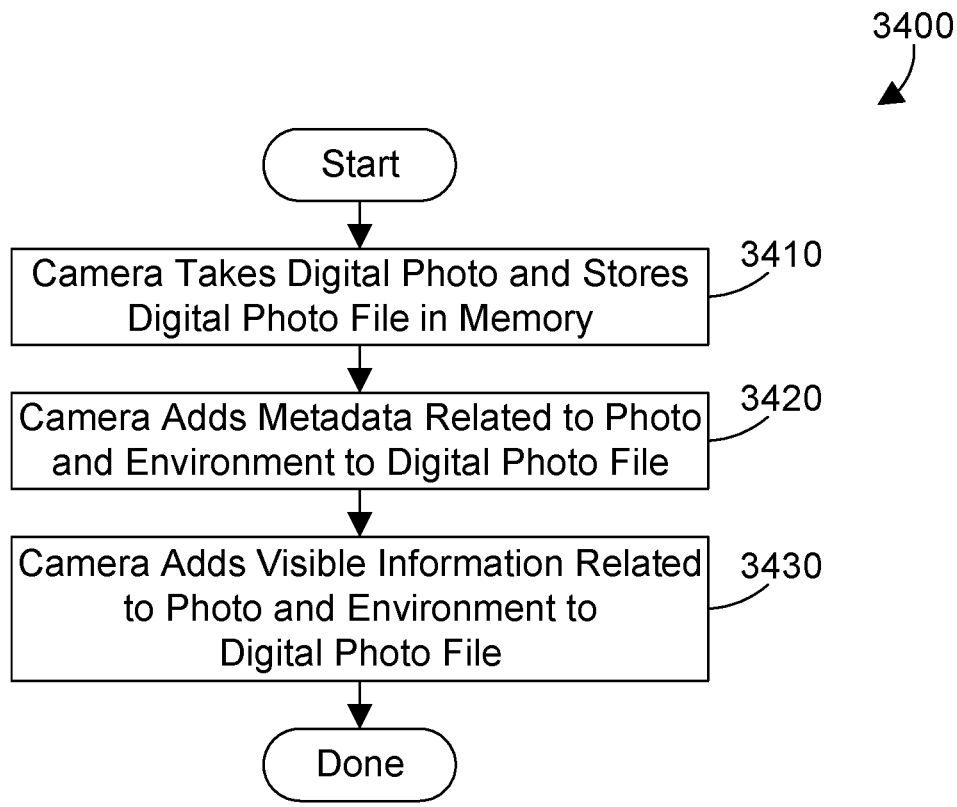
FIG. 33 shows a table of camera operational logic for the system shown in FIG. 32.
FIG. 34 is a flow diagram of a method for adding visible data to a digital photo file.
Figure 36:
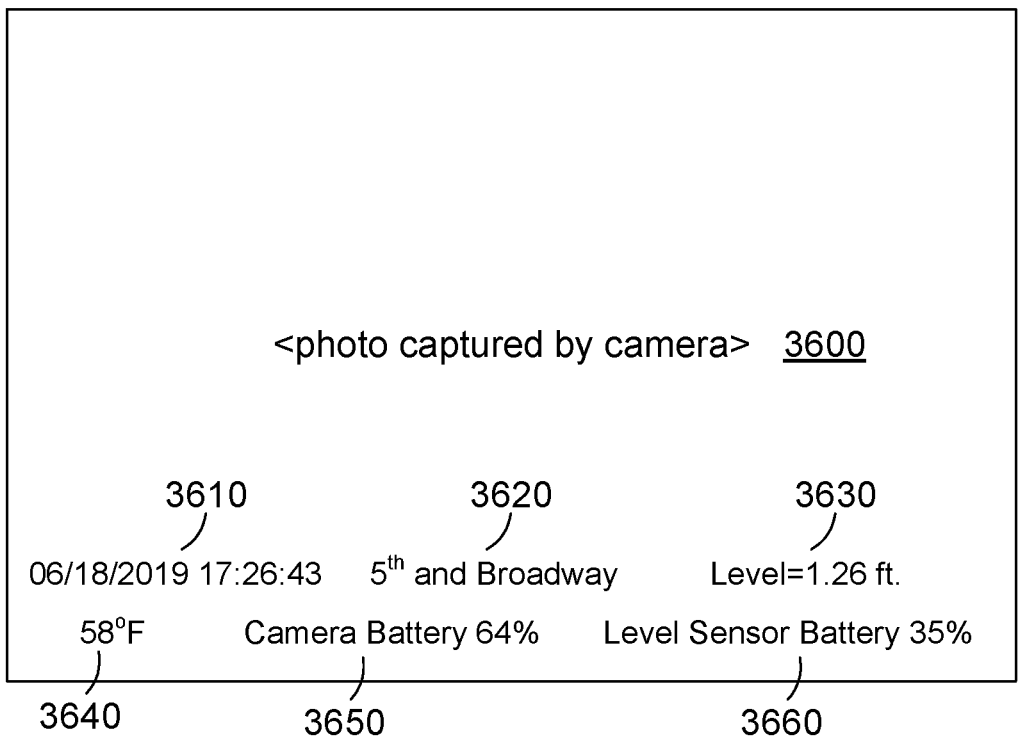
FIG. 36 is a first sample photograph with visible information added.

Because the digital camera is located in a wastewater pipe, adding information to a photograph that describes the camera environment can be very helpful. Referring to FIG. 34, a method 3400 begins when a camera takes a digital photo and stores the digital photo as a digital photo file in the camera's memory (step 3410). The camera adds metadata related to the photograph and the environment to the digital photo file (step 3420). Metadata is data that is not visible on the photograph itself, but is data that is embedded in the digital photo file and can be read electronically. The camera further adds visible information related to the photo and the environment to the digital photo file (step 3430). Specific examples of visible information that could be added to a digital photo file are shown in FIGS. 36 and 37, which are discussed in more detail below.

Figure 35:
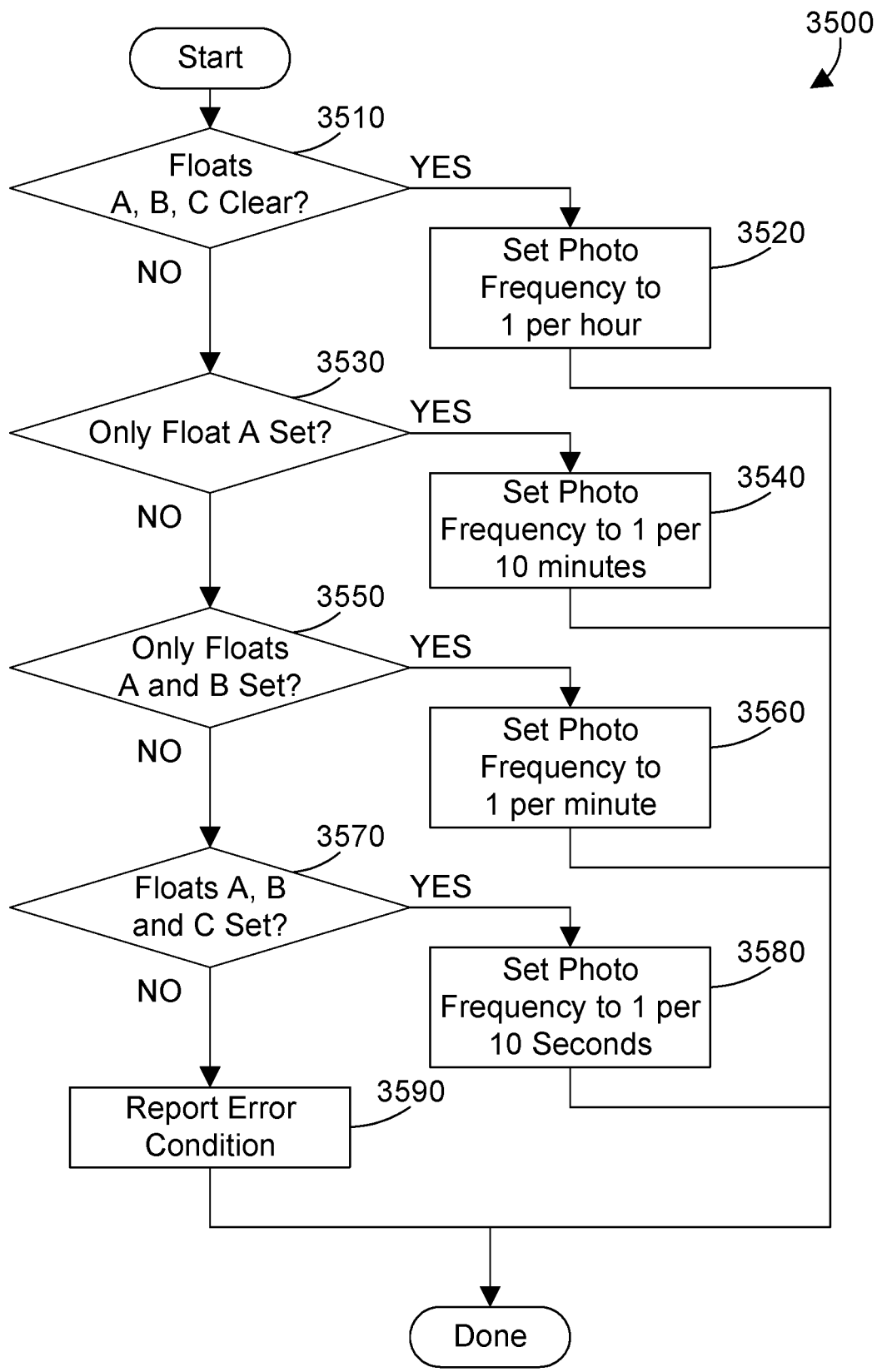
FIG. 35 is a flow diagram of a method performed by the digital camera for the system shown in FIG. 32 according to the camera operational logic shown in FIG. 33.

A method 3500 in FIG. 35 illustrates the function of the camera operational logic 2952 in the system 3200 shown in FIG. 32. When floats A, B and C are clear (step 3510=YES), the photo frequency is set to one photo per hour (step 3520). When only float A is set (step 3530=YES), the photo frequency is set to one photo per 10 minutes (step 3540). When only floats A and B are set (step 3550=YES), the photo frequency is set to one photo per minute (step 3560). When all of floats A, B and C are set (step 3570=YES), the photo frequency is set to one photo per ten seconds, which could also be expressed as six photos per minute (step 3580). When step 3570=NO, this means one or more of the floats are malfunctioning, so an error condition is reported (step 3590). Error conditions that result in step 3570=NO include: only float B is set; only float C is set; floats B and C are set but float A is not set; floats A and C are set but float B is not set. The error condition reported in step 3590 could be logged by the camera until the error condition can be reported to the wastewater control system, such as 2223 shown in FIG. 22.

One feature of the digital camera disclosed and claimed herein is the ability to add visible information to one or more of the pictures that provide information regarding the environment where the camera is located, which is represented in step 3430 in FIG. 34. A digital photo 3600 is represented in FIG. 36, which corresponds to the photo captured by the camera. Various visible information can be added so the visible information is on the photograph itself, making the visible information visible to a human or machine observing the photograph 3600. Examples of suitable visible information that could be added to the photograph include: date and time; location; level received from the level sensor; temperature; camera battery status; and level sensor battery status. A suitable example of date and time is shown at 3610 in FIG. 36. A suitable example of location is shown at 3620. In this example, the location is "5$^{th}$ and Broadway", which could designate an intersection near which the wastewater monitoring system is installed. The location can be specified in any suitable way, including GPS coordinates, manhole number, etc. A suitable example of data from a level sensor is shown at 3630, showing the level at 1.26 ft. The level 3630 assumes a non-binary level sensor, such as the iTracker, is used that can report level in suitable units rather than just tripping a binary signal. The temperature 3640 is shown as 58° F. The camera battery life 3650 is shown at 64%. The level sensor battery life 3660 is shown as 35%.

Figure 37:
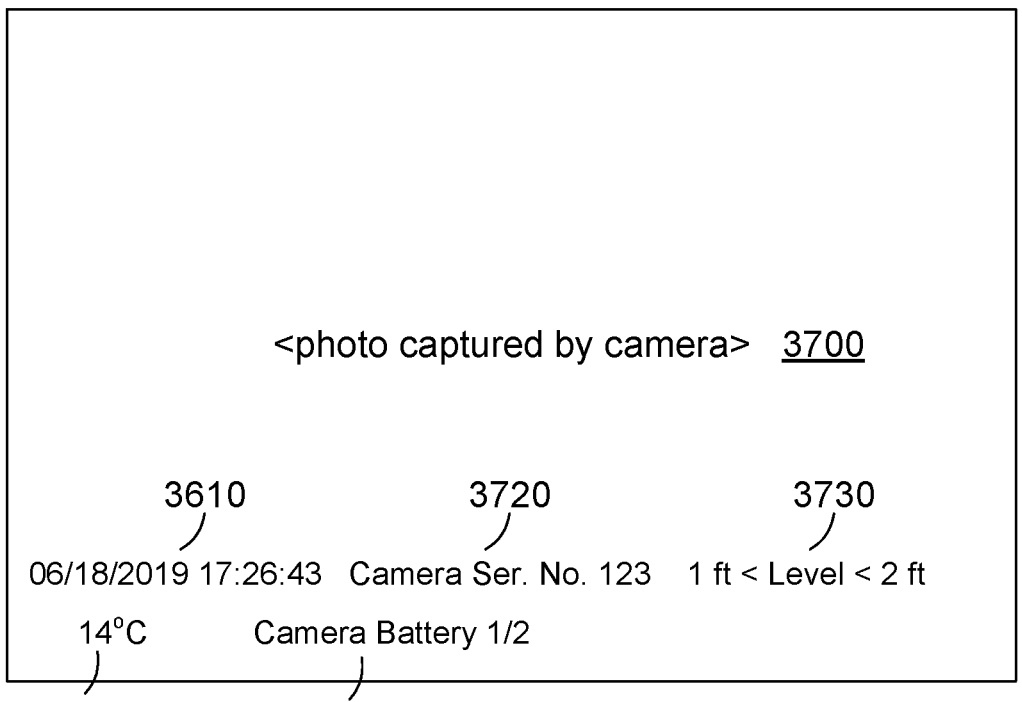
FIG. 37 is a second sample photograph with visible information added.

A second example photograph 3700 is shown in FIG. 37. Visible information added to the digital photograph file for photograph 3700 includes: date and time 3610; camera serial number 3720; level 3730 derived from binary level sensors; temperature 3740 in degrees Celsius; and camera battery life 3750 expressed as a fraction. The date and time 3610 is shown in the same format as in FIG. 36, but could be any suitable format for expressing date and time, whether currently known or developed in the future. Camera serial number 3720 can serve as an indicator for location. While a camera serial number in general tells nothing about a camera's location for normal cameras that people take to various locations to take photographs, when the camera is mounted in a fixed location as disclosed herein, the camera serial number can be logged in the system and correlated to the geographical location of the camera. The camera serial number 3720 thus becomes an indirect indicator of location, because the wastewater management system knows the serial number and corresponding location where each camera is installed. The level 3730 is derived from trip signals from binary sensors, such as the floats shown in FIG. 32. When float A is set but floats B and C are cleared, this means the water level is between 1 ft. and 2 ft., as shown at 3730. The temperature 3740 and camera battery level 3750 are shown different than in FIG. 36 simply to show that different units and visible representations can be used for the visible information added to a digital photograph file. The level sensor battery level is not shown in FIG. 37 because binary sensors typically do not need a battery. A binary sensor, such as a float, typically has a switch that is open when the float is in one position and that closes when the float moves to a different position. A suitable signal can be routed through the switch, and the presence or absence of the signal can thus provide the two binary states for the binary sensor, with one state defining an active trip signal and the other state defining an inactive trip signal.

Adding some types of visible information to a photograph is well-known. For example, digital cameras have long been able to add the date and time as visible information to a digital photograph file. However, some of the visible information added to a digital photograph file as disclosed herein is new and would not have been obvious to one of ordinary skill in the art. The level received from one or more level sensors is information not generated by the camera that can be added as visible information. The camera herein adds information from a device such as a level sensor external to the camera as visible information to a digital photograph taken by the camera, which is not known in the art. The temperature of the camera or an environment surrounding the camera is information that would not normally be present in known cameras and would not be relevant to most photographs. However, the temperature of the camera or environment surrounding the camera can be very relevant to wastewater monitoring. The camera battery level is a needed piece of information so the wastewater control system knows when the battery in a camera need to be replaced. It is known to display battery level on a display on a camera, but not to add the battery level as visible information to a digital photograph file. In addition, visible information relating to the level sensor battery level can be added as visible information to a digital photograph file. Because the digital photograph is of wastewater in a wastewater monitoring system, the level information added as visible information to the digital photograph file is very useful. Furthermore, adding a camera's serial number as visible information to a digital photograph file would not make sense with cameras that are mobile. However, since the camera disclosed herein is mounted in a fixed location to monitor wastewater, the serial number of the camera and the location of the camera with that serial number can be logged when the camera and level sensor(s) are initially installed. Once installed, the serial number of the camera acts as a surrogate for geographical location because the wastewater control system know how to correlate the serial number of the camera to the camera's location. While adding some information as visible information to a digital photograph file might be obvious in light of known prior art, adding camera serial number, level from one or more level sensors, temperature, camera battery level and level sensor battery level would not have been obvious in light of the known prior art.

The wastewater monitoring system could include a real-time connection to a network that allows sending alerts to changing conditions. For example, a manhole might be in a street in proximity to a café that offers free Wi-Fi, allowing the wastewater monitoring system to connect via its wireless interface to the café's Wi-Fi network. In addition, various cities have initiatives to have "smart cities" with various interconnected networks throughout the city. The camera could connect to one of these networks as well. Of course, the camera could connect to a cellular network as well. Thus, when the camera detects water on its housing, a real-time alert could be sent indicating that is water on the camera housing. When the temperature sensor detects a change in temperature in the location of interest, a real-time alert could be sent. When the pressure sensor detects a change in pressure on the camera housing, a real-time alert could be sent to signal an overflow condition. In addition, the camera could use any or all of these conditions to change its own function in addition to sending the real-time alert(s). An operator could receive a real-time alert, such as an e-mail or a text message, which would then enable the operator to better understand the conditions where the wastewater monitoring system is installed. The video stream generated from the photographs could also be tagged to indicate to the user when the real-time alert occurred. This could be done by the camera itself, or by the photo processing system using timestamps to correlate the real-time alerts to the corresponding photograph or photographs in the video stream.

A wastewater monitoring system uses a digital camera in a fixed location in a wastewater pipe. The digital camera is coupled to a binary sensor that provides a binary trip signal that indicates when the sensor detects wastewater in the pipe exceeding a defined threshold. When the digital camera detects a trip signal from the binary sensor, operating logic in the digital camera changes frequency for taking pictures. The digital camera preferably adds visible data to a stored digital photograph file that may include any or all of the following: camera serial number, state of one or more sensors, temperature, battery level of a battery in the digital camera, and battery level of a battery in one or more sensor(s). The visible data is stored in the digital photograph file such that the visible information is overlaid on the digital photograph so it is visible to the eye of the person viewing the digital photograph.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A digital camera comprising:
an image sensor for taking a digital photograph and storing the digital photograph in a corresponding digital photograph file in a memory;
a sensor interface coupled to a binary sensor that provides a binary trip signal to the sensor interface when the binary sensor detects a predetermined condition; and
operational logic that defines a first frequency for the digital camera to take photographs and a second frequency for the digital camera to take photographs that is greater than the first frequency for the digital camera to take photographs, wherein the operational logic monitors the sensor interface, and when the binary trip signal is not detected on the sensor interface, the operational logic causes the digital camera to take a plurality of photographs at the first frequency, and when the binary trip signal is detected on the sensor interface, the operational logic causes the digital camera to take a plurality of photographs at the second frequency.

2. The digital camera of claim 1 wherein the binary sensor comprises a level sensor that provides the binary trip signal when a level detected by the level sensor exceeds a predetermined threshold.

3. The digital camera of claim 2 wherein the level sensor detects level of water in a wastewater pipe.

4. The digital camera of claim 1 further comprising a temperature sensor that provides a temperature, wherein the operational logic, after storing the digital photograph file in the memory, adds the temperature received from the temperature sensor as visible information to the digital photograph file in the memory.

5. The digital camera of claim 1 further comprising a battery that provides power to the digital camera and a battery sensor that detects a level of the battery, wherein the operational logic, after storing the digital photograph file in the memory, adds the level of the battery received from the battery sensor as visible information to the digital photograph file in the memory.

* * * * *